United States Patent
Saka

(10) Patent No.: US 9,473,669 B2
(45) Date of Patent: Oct. 18, 2016

(54) ELECTRONIC DOCUMENT GENERATION SYSTEM, ELECTRONIC DOCUMENT GENERATION APPARATUS, AND RECORDING MEDIUM

(71) Applicant: Konica Minolta, Inc., Chiyoda-ku, Tokyo (JP)

(72) Inventor: Masaaki Saka, Toyohashi (JP)

(73) Assignee: KONICA MINOLTA, INC, Chiyoda-Ku. Tokyo (JP)

(*) Notice: Subject to any disclaimer, the term of this patent is extended or adjusted under 35 U.S.C. 154(b) by 0 days.

(21) Appl. No.: 14/797,690

(22) Filed: Jul. 13, 2015

(65) Prior Publication Data

US 2016/0014296 A1 Jan. 14, 2016

(30) Foreign Application Priority Data

Jul. 11, 2014 (JP) ................. 2014-143605

(51) Int. Cl.
| | |
|---|---|
| H04N 1/32 | (2006.01) |
| H04N 1/40 | (2006.01) |
| H04N 1/41 | (2006.01) |
| H04N 1/387 | (2006.01) |
| H04N 1/64 | (2006.01) |

(52) U.S. Cl.
CPC .......... *H04N 1/3255* (2013.01); *H04N 1/3876* (2013.01); *H04N 1/40062* (2013.01); *H04N 1/41* (2013.01); *H04N 1/642* (2013.01); *H04N 2201/0094* (2013.01)

(58) Field of Classification Search
None
See application file for complete search history.

(56) References Cited

U.S. PATENT DOCUMENTS

| 8,996,350 B1* | 3/2015 | Dub .................. | G06F 17/30705 704/1 |
| 2009/0052804 A1* | 2/2009 | Lewis ............... | G06F 17/30253 382/298 |

FOREIGN PATENT DOCUMENTS

| JP | 2008193234 A | 8/2008 |
| JP | 2012022571 A | 2/2012 |
| JP | 2012073749 A | 4/2012 |

* cited by examiner

*Primary Examiner* — Scott A Rogers
(74) *Attorney, Agent, or Firm* — Cantor Colburn LLP

(57) ABSTRACT

An electronic document generation apparatus includes a processing execution unit that executes first processing for generating an electronic document on the basis of a scanned image of an original document. When data to be used in second processing executed by a cooperative apparatus of the electronic document generation apparatus is generated by one of a plurality of sub-processes of the first processing, the processing execution unit transmits the data to the cooperative apparatus at a stage where there is a remaining unexecuted process among the sub-processes, and continues with execution of the remaining unexecuted process among the sub-processes. The electronic document generation apparatus receives a result of the second processing executed on the data by the cooperative apparatus from the cooperative apparatus, and generates the electronic document on the basis of the result of the second processing and the result of the first processing executed by the processing execution unit.

22 Claims, 13 Drawing Sheets

ELECTRONIC DOCUMENT GENERATION SYSTEM, ELECTRONIC DOCUMENT GENERATION APPARATUS, AND RECORDING MEDIUM

CROSS REFERENCE TO RELATED APPLICATIONS

The present invention claims priority under 35 U.S.C. §119 to Japanese Application No. 2014-143605 filed on Jul. 11, 2014, the entire content of which is incorporated herein by reference.

BACKGROUND OF INVENTION

1. Technical Field

The present invention relates to an electronic document generation system for generating an electronic document and a technique related thereto.

2. Background Art

Techniques for scanning an original document to generate an electronic document are known for use in an image forming apparatus such as a Multi-Functional Peripheral (MFP).

Examples of the electronic document generation techniques include a technique for generating an electronic document (e.g., a compact PDF document) by separating a scanned image into a character area and a non-character area (e.g., a photographic area) and compressing the non-character area at a relatively high compression rate and the character area at a relatively low compress (see Japanese Patent Application Laid-Open No. 2008-193234, for example). With this technique, it is possible to reduce the capacity (improve the compactness) of an electronic document file while maintaining the viewability of characters.

The examples also include a technique for generating an electronic document with text data, which will be described later (see Japanese Patent Application Laid-Open No. 2012-073749, for example). More specifically, a scanned image (in particular, an image representing characters) of an original document is subjected to optical character recognition processing (hereinafter also referred to as "OCR processing") so that text data of characters in the scanned image is automatically recognized and overlaid with and embedded in the scanned image without being displayed. This produces an electronic document in a predetermined format (electronic document with text data) such as a PDF (portable document format) (or searchable PDF) document with invisible text.

There is also a technique for generating an electronic document (also referred to as a "searchable compact PDF file," for example) that is compact (highly compressed) and searchable. With this technique, processing (also referred to as "compactness improving processing") including a series of sub-processes for making a document compact (e.g., an area separation process and a compression process), and OCR processing for making a document searchable (also referred to as "searchableness improving processing") are performed, and the results of the compactness improving processing and the searchableness improving processing are used as a basis to generate an electronic document.

Incidentally, it is conceivable to cause another apparatus (also referred to as a "cooperative apparatus") different from an apparatus (electronic document generation apparatus) for generating an electronic document on the basis of a scanned image to execute OCR processing (searchableness improving processing), instead of the electronic document generation apparatus performing the OCR processing in addition to the aforementioned processing (compactness improving processing) consisting of a series of sub-processes. To be more specific, the electronic document generation apparatus first executes the series of sub-processes, then causes the cooperative apparatus (e.g., a cloud server) to perform OCR processing, and uses the result of OCR processing received from the cooperative apparatus to generate an electronic document.

In such processing, however, the OCR processing, which is a process separate from the series of sub-processes, is further executed after continuous execution and completion of the series of sub-processes. Thus, the cooperative apparatus cannot start execution of the OCR processing until the series of sub-processes is completed. This reduces efficiency in processing.

SUMMARY OF INVENTION

It is an object of the present invention to provide a technique that can improve the efficiency of generating an electronic document in a technique in which a plurality of apparatuses cooperate to generate an electronic document.

According to a first aspect of the present invention, an electronic document generation system for generating an electronic document includes a first apparatus configured to execute first processing for generating an electronic document on the basis of a scanned image of an original document, and a second apparatus configured to execute second processing for generating the electronic document in response to a request received from the first apparatus and transmit a result of the second processing to the first apparatus. The first apparatus includes a processing execution unit configured to execute the first processing, the processing execution unit being configured to, when data to be used in the second processing is generated by one of a plurality of sub-processes of the first processing, transmit the data to the second apparatus at a stage where there is a remaining unexecuted process among the plurality of sub-processes, and continue with execution of the remaining unexecuted process among the plurality of sub-processes, a reception unit configured to receive a result of the second processing executed on the data by the second apparatus, from the second apparatus, and a generation unit configured to generate the electronic document on the basis of the result of the first processing executed by the processing execution unit and the result of the second processing received by the reception unit.

According to a second aspect of the present invention, an electronic document generation apparatus for generating an electronic document in cooperation with a cooperative apparatus includes a processing execution unit configured to execute first processing for generating an electronic document on the basis of a scanned image of an original document, the processing execution unit being configured to, when data to be used in second processing executed by the cooperative apparatus is generated by one of a plurality of sub-processes of the first processing, transmit the data to the cooperative apparatus at a stage where there is a remaining unexecuted process among the plurality of sub-processes, and continue with execution of the remaining unexecuted process among the plurality of sub-processes, a reception unit configured to receive a result of the second processing executed on the data by the cooperative apparatus, from the cooperative apparatus, and a generation unit configured to generate the electronic document on the basis of a result of the first processing executed by the processing execution unit and the result of the second processing received by the reception unit.

According to a third aspect of the present invention, a non-transitory computer-readable recording medium that stores a program for causing a computer that is built into an electronic document generation apparatus for generating an electronic document in cooperation with a cooperative apparatus, to execute the steps of a) starting first processing for generating an electronic document on the basis of a scanned image of an original document, b) when data to be used in second processing executed by the cooperative apparatus is generated by one of a plurality of sub-processes of the first processing, transmitting the data to the cooperative apparatus at a stage where there is a remaining unexecuted process among the plurality of sub-processes, and continuing with execution of the remaining unexecuted process among the plurality of sub-processes, c) receiving a result of the second processing executed on the data by the cooperative apparatus, from the cooperative apparatus, and d) generating the electronic document on the basis of a result of the first processing executed by the electronic document generation apparatus and the result of the second processing received in the step c).

These and other objects, features, aspects and advantages of the present invention will become more apparent from the following detailed description of the present invention when taken in conjunction with the accompanying drawings.

DETAILED DESCRIPTION OF PREFERRED EMBODIMENTS

Hereinafter, embodiments of the present invention will be described with reference to the accompanying drawings.

1. First Embodiment 1-1. Overview of Configuration

Figure 1:
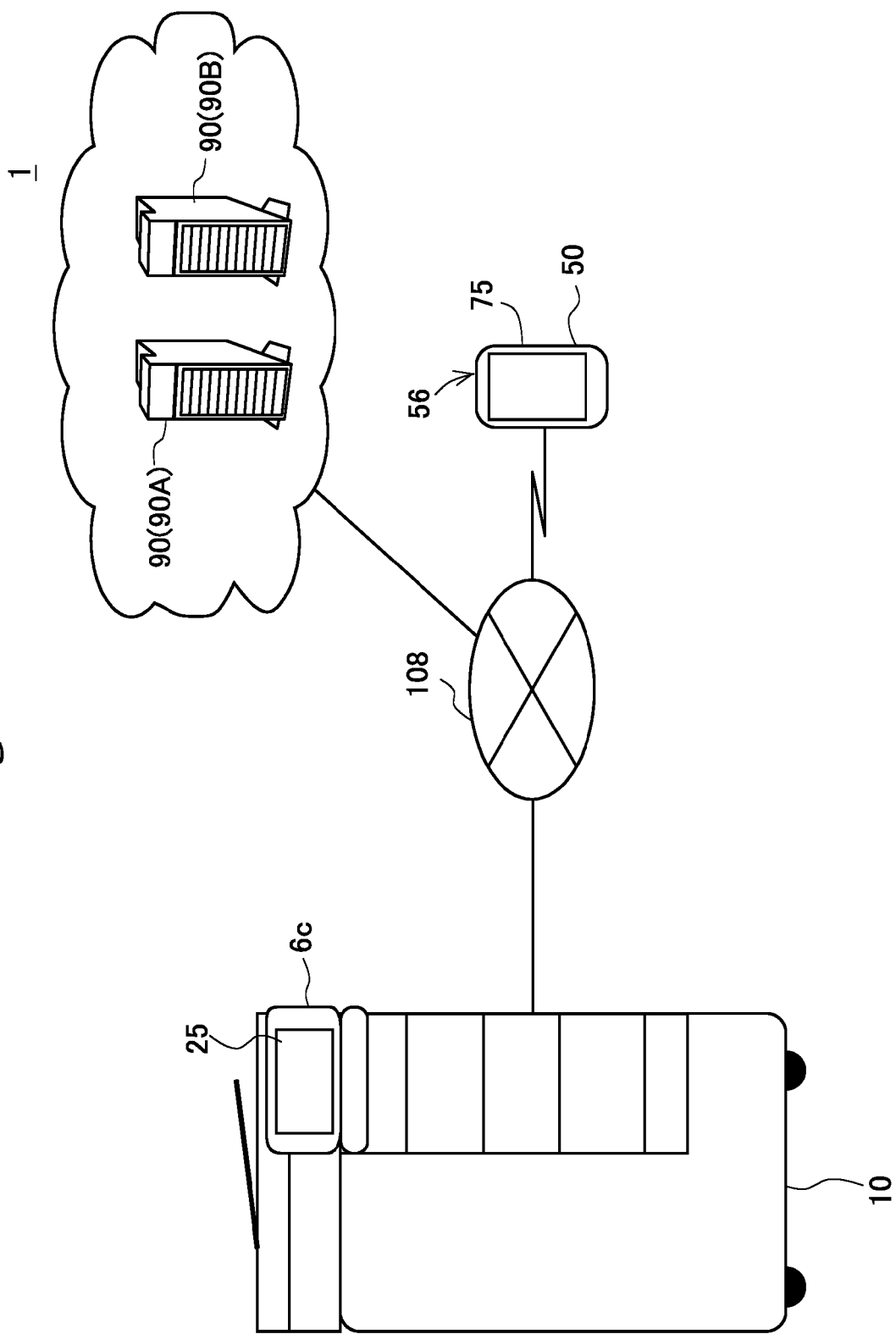
FIG. 1 illustrates an electronic document generation system.

FIG. 1 illustrates an electronic document generation system 1 according to the present invention. This electronic document generation system is a system in which a plurality of processes are shared among and executed by a plurality of apparatuses to generate an electronic document. As illustrated in FIG. 1, the electronic document generation system 1 includes an image forming apparatus 10, an external terminal 50, and cloud servers 90.

The image forming apparatus 10, the external terminal 50, and the cloud servers 90 are connected to one another via a network (communication network) 108. The network 108 is, for example, a local area network (LAN) or the Internet. The connection to the network 108 may be either wired or wireless connection. For example, the image forming apparatus 10 and the cloud servers 90 are wire-connected to the network 108, and the external terminal 50 is wirelessly connected to the network 108.

The external terminal 50 is an apparatus for generating an electronic document on the basis of a scanned image generated by the image forming apparatus 10, and is also referred to as an "electronic document generation apparatus." The external terminal 50 has an electronic document generation application 110 installed therein. The external terminal 50 uses the electronic document generation application 110 to generate an electronic document in cooperation with other apparatuses (e.g., cloud servers 90).

The cloud servers 90 (e.g., 90A and 90B) are external apparatuses (external servers) that are separate from the image forming apparatus 10 and the external terminal 50. Each cloud server 90 (e.g., 90A) has an application 120 (here, a general-purpose optical character recognition (OCR) application) installed therein. The cloud server 90 uses the application 120 to provide a general-purpose OCR processing service. It is, however, noted that the cloud server 90 (application 120) does not provide a service of generating a searchable PDF (portable document format) document. A searchable PDF file is generated by, for example, the external terminal 50 and the cloud servers 90 cooperating with each other as will be described later.

In the electronic document generation system 1, the image forming apparatus 10 generates a scanned image 200 (see, for example, FIG. 5) of an original document and transmits the scanned image 200 to the external terminal 50. The external terminal 50 generates an electronic document 500 (see, for example, FIG. 5) on the basis of the scanned image 200 received (acquired) from the image forming apparatus 10. The operation of generating the electronic document 500 is implemented by, for example, executing the electronic document generation application 110 installed in the external terminal 50.

The electronic document generation application 110 executes processing P1 (described later) that includes a series of sub-processes. Here, processing for generating a PDF file (electronic file in a compact PDF format) that has a relatively small file capacity is executed as the processing P1. More specifically, a character area 210 and a non-character area (e.g., background area) are separated and extracted from the scanned image 200 and subjected to processing such as compression processing in which the character area and the non-character area are compressed at different compression rates. This reduces the capacity (file capacity) of the electronic document.

The character area 210 separated from the scanned image 200 is also subjected to another processing (also referred to as "cooperative processing") P2 (in the present example, OCR processing) that is different from the processing P1 and performed by a cloud server 90 (also referred to as a "cooperative apparatus"). More specifically, the OCR processing service provided by the application 120 of the cloud server 90 is used to perform OCR processing on the character area 210.

Then, the external terminal 50 performs processing P5 for generating an electronic document on the basis of the results of the processing P1 and the processing P2. More specifically, the electronic document generation application 110 of the external terminal 50 acquires the result (compressed image data) of the processing P1 performed by the external terminal 50 and receives the result (OCR processing result or text data) of the processing P2 performed on the character area 210 by the cloud server 90 from the general-purpose application 120. The results of the processing P1 and the processing P2 are then used as a basis to generate an electronic document. The electronic document 500 is generated in the form of an electronic document (here, a searchable compact PDF file) with text data.

1-2. Configuration of Image Forming Apparatus

Figure 2:
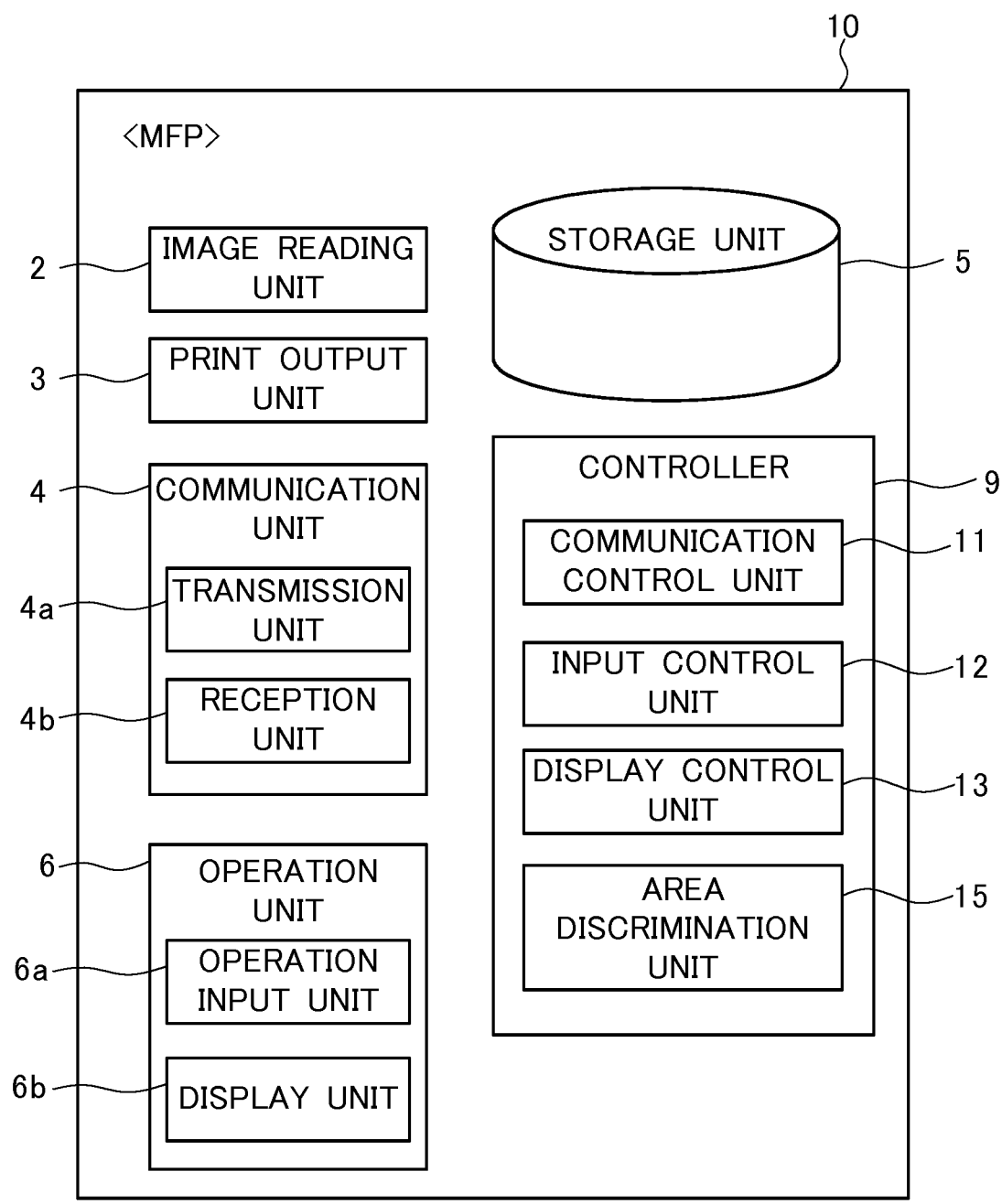
FIG. 2 is a functional block diagram of an image forming apparatus.

FIG. 2 is a functional block diagram of the image forming apparatus 10. Here, a Multi-Functional Peripheral (MFP) is illustrated as an example of the image forming apparatus 10. FIG. 2 illustrates functional blocks of the MFP 10.

The MFP 10 is an apparatus (also, referred to as a "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an operation unit 6, and a controller 9 as illustrated in the functional block diagram of FIG. 2, and implements various types of functions by operating these units in combination.

The image reading unit 2 is a processing unit configured to optically read (i.e., scan) an original document placed at a predetermined position on the MFP 10 and generate image data of the original document (also referred to as an "original image" or a "scanned image"). The image reading unit 2 is also referred to as a "scanning unit."

The print output unit 3 is an output unit configured to print out an image on various types of media such as paper on the basis of data regarding an object to be printed.

The communication unit 4 is a processing unit capable of facsimile communication via a public network, for example. The communication unit 4 is also capable of network communication via the network 108. In the network communication, various types of protocols such as TCP/IP (Transmission Control Protocol/Internet Protocol) are used. Using the network communication enables the MFP 10 to exchange various types of data with desired destinations (e.g., the external terminal 50). The communication unit 4 includes a transmission unit 4a configured to transmit various types of data and a reception unit 4b configured to receive various types of data.

The storage unit 5 is a storage device such as a hard disk drive (HDD).

The operation unit 6 includes an operation input unit 6a configured to receive input of operation to the MFP 10, and a display unit 6b configured to display and output various types of information.

The MFP 10 is provided with a generally plate-like operation panel unit 6c (see FIG. 1). The operation panel unit 6c includes a touch panel 25 (see FIG. 1) on the front side. The touch panel 25 functions as not only part of the operation input unit 6a but also part of the display unit 6b. The touch panel 25 is configured by embedding various types of sensors or other constituent elements in a liquid crystal display panel, and is capable of displaying various types of information as well as receiving various types of operation input from an operator.

For example, the touch panel 25 displays various types of operation screens (e.g., a menu screen), which includes images of buttons, for example. By pressing such buttons virtually arranged in the operation screen of the touch panel 25, the operator can set the details of various types of operations to be performed by the MFP 10 and can issue operational instructions.

The controller 9 is a control device that is built into the MFP 10 and configured to perform overall control of the MFP 10. The controller 9 is configured as a computer system that includes a CPU and various types of semiconductor memories (RAM and ROM), for example. The controller 9 implements various types of processing units by causing the CPU to execute a predetermined software program (hereinafter also simply referred to as a "program") stored in a ROM (e.g., EEPROM). Note that the program (specifically, a group of program modules) may be recorded in a portable recording medium (or in other words, any of various types of non-transitory computer-readable recording media) such as a USB memory, read out from the recording medium, and installed into the MFP 10. Alternatively, the program may be downloaded via the network 108 or the like and installed into the MFP 10.

More specifically, the controller 9 executes the program to implement various types of processing units including a communication control unit 11, an input control unit 12, a display control unit 13, and an area discrimination unit 15, as illustrated in FIG. 2.

The communication control unit 11 is a processing unit configured to control an operation of communication with another device (e.g., the external terminal 50) in cooperation with the communication unit 4, for example. For example, the communication control unit 11 transmits a scanned image or the like to the external terminal 50.

The input control unit 12 is a control unit configured to control operation input to the operation input unit 6a (e.g., the touch panel 25). For example, the input control unit 12 controls an operation of receiving operation input to an operation screen displayed on the touch panel 25.

The display control unit 13 is a processing unit configured to control a display operation of the display unit 6b (e.g., the touch panel 25). For example, the display control unit 13 causes the touch panel 25 to display an operation screen for operating the MFP 10.

Figure 4:
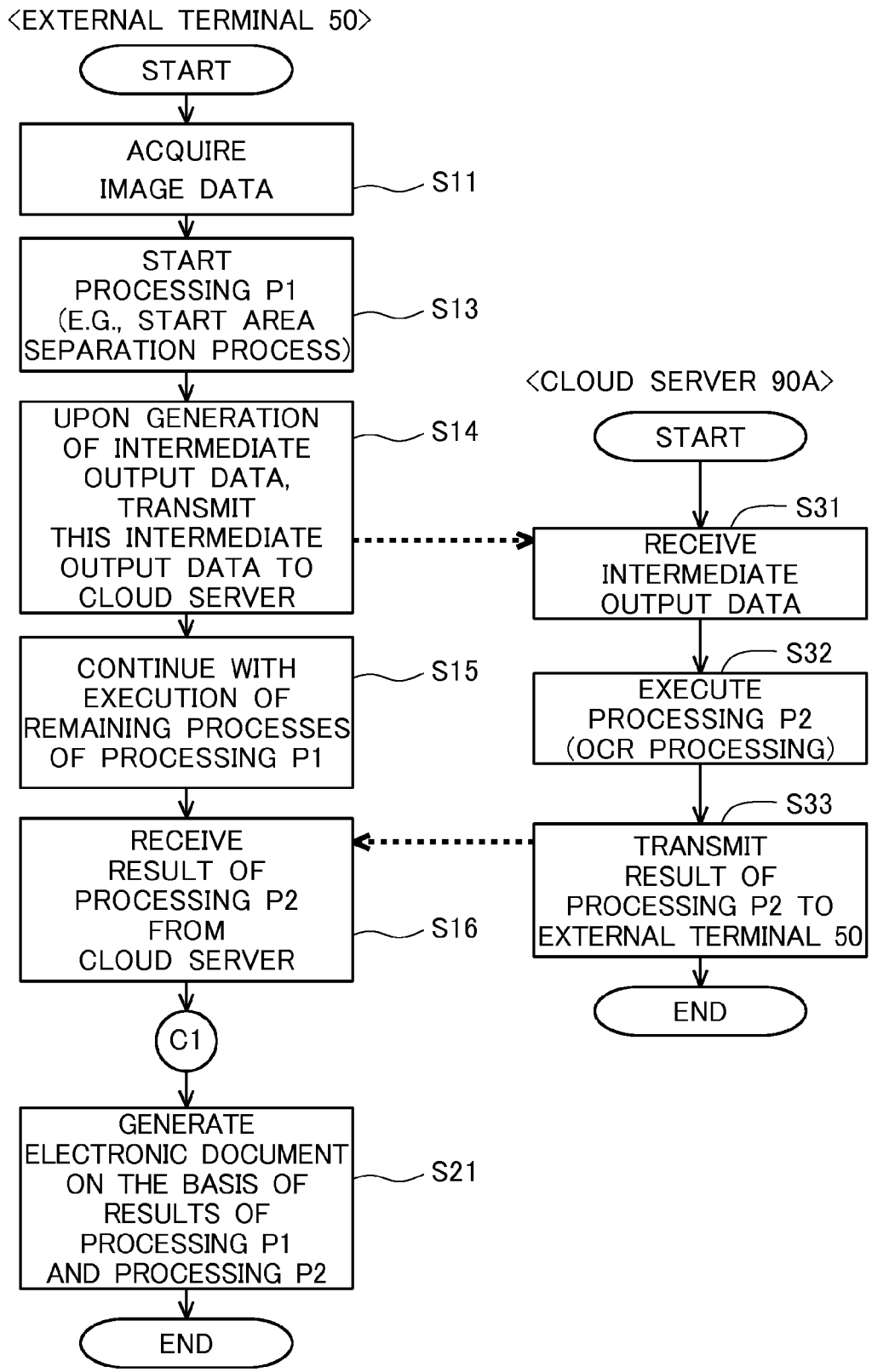
FIG. 4 is a flowchart of operations performed by the external terminal and a cloud server.

The area discrimination unit 15 is a processing unit configured to discriminate areas (area types) in the scanned image 200 (see FIG. 4). For example, the area discrimination unit 15 makes a distinction and discrimination between a character area 210 and a non-character area (e.g., a background area and a photographic area) 220 in the scanned image 200.

1-3. Configuration of External Terminal

Next is a description of a configuration of the external terminal 50.

The external terminal 50 is an information input/output terminal device (also referred to as an "information terminal" or a "communication terminal") capable of network communication with the MFP 10 and the cloud server 90. Here, a tablet terminal is illustrated as an example of the external terminal 50. The present invention is, however, not limited to this example, and the external terminal 50 may be other devices such as a smartphone or a personal computer.

The external terminal 50 may also be either a portable device (e.g., a personal digital assistant or a mobile terminal) or a stationary device.

Figure 3:
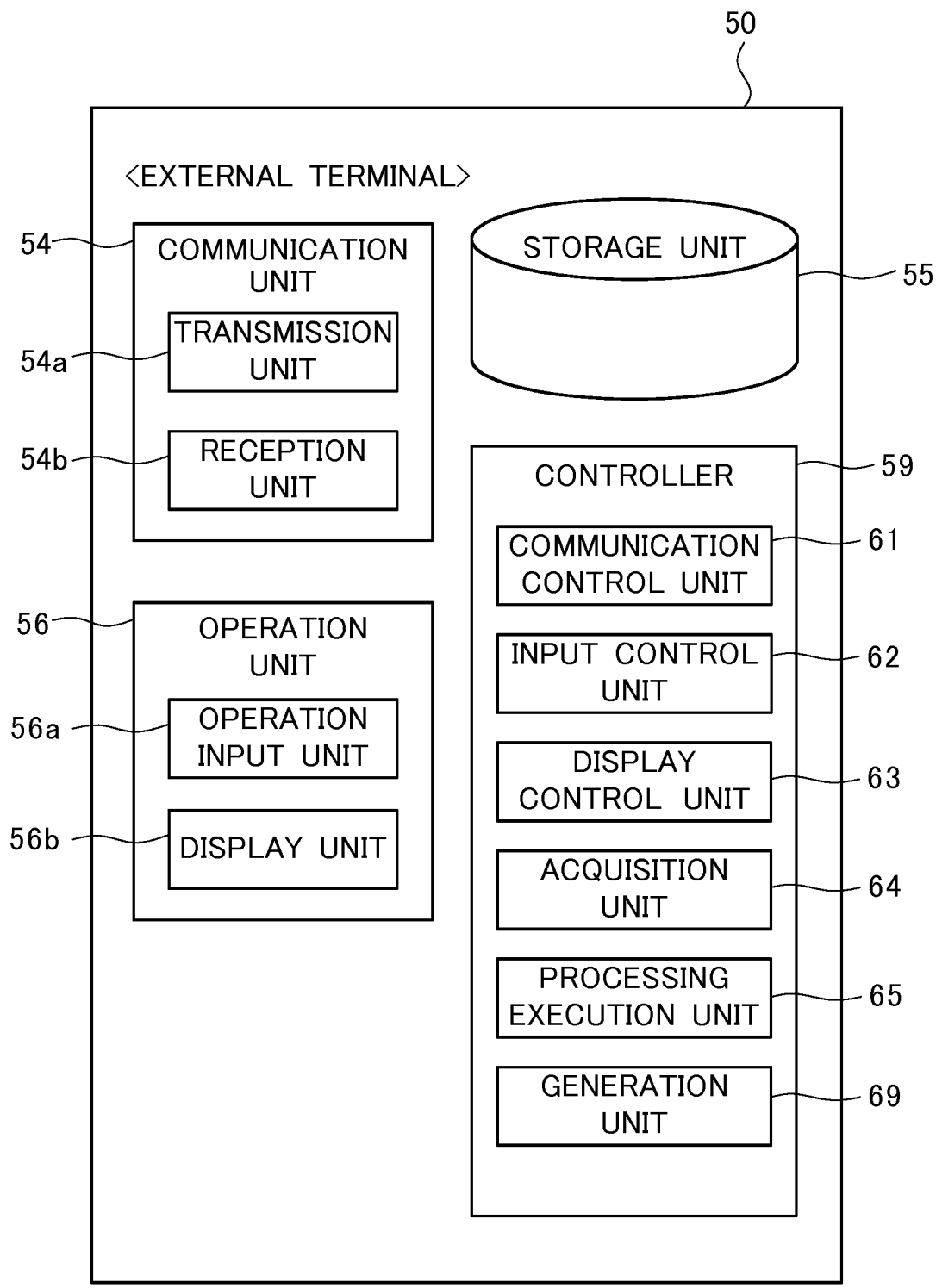
FIG. 3 is a functional block diagram of a schematic configuration of an external terminal.

FIG. 3 is a functional block diagram illustrating a schematic configuration of the external terminal 50.

As illustrated in the functional block diagram of FIG. 3, the external terminal 50 includes, for example, a communication unit 54, a storage unit 55, an operation unit 56, and a controller 59 and implements various types of functions by operating these units in combination.

The communication unit 54 is capable of network communication via the network 108. In the network communication, various types of protocols such as TCP/IP (Transmission Control Protocol/Internet Protocol) are used. Using the network communication allows the external terminal 50 to exchange various types of data with desired destinations (e.g., the MFP 10 and the cloud servers 90). The communication unit 54 includes a transmission unit 54a configured to transmit various types of data and a reception unit 54b configured to receive various types of data. For example, the reception unit 54b receives the scanned image 200 from the MFP 10, and the transmission unit 54a transmits image data of the character area 210 (see FIG. 4) in the scanned image 200 to the cloud servers 90. The reception unit 54b receives, for example, the result of OCR processing performed on the scanned image 200 from the cloud servers 90.

The storage unit 55 is a storage device such as a non-volatile semiconductor memory and stores various types of information.

The operation unit 56 includes an operation input unit 56a configured to receive operation input to the external terminal 50, and a display unit 56b configured to display and output various types of information. The external terminal 50 is provided with a touch panel 75 (see FIG. 1) that is configured by embedding various types of sensors and other constituent elements in a liquid crystal display panel. More specifically, as illustrated in FIG. 1, the touch panel 75 is provided on substantially the entire front surface, excluding the periphery (frame portion), on the front side of the generally plate-like external terminal 50. The touch panel 75 functions as a user interface. In other words, the touch panel 75 functions as not only part of the operation input unit 56a but also part of the display unit 56b.

The controller 59 in FIG. 3 is a control device that is built into the external terminal 50 and configured to perform overall control of the external terminal 50. The controller 59 is configured as a computer system that includes a CPU and various types of semiconductor memories (RAM and ROM), for example. The controller 59 implements various types of processing units by causing the CPU to execute a predetermined software program (hereinafter, also simply referred to as a "program") stored in a storage unit (e.g., a semiconductor memory). Note that this program (specifically, a group of program modules) may be recorded in a portable recording medium (or in other words, any of various types of non-transitory computer-readable recording media) such as a USB memory, read out from the recording medium, and installed into the external terminal 50. Alternatively, the program may be downloaded via the network 108 or the like and installed into the external terminal 50.

The external terminal 50 has an application program (also simply referred to as an "application) 110 installed therein to control processing performed in cooperation with the image forming apparatus 10. By executing the application program 110, the external terminal 50 receives the scanned image generated by the image forming apparatus 10 from the image forming apparatus 10 and uses this scanned image to execute processing for generating an electronic document.

More specifically, the controller 59 implements various types of processing units including a communication control unit 61, an input control unit 62, a display control unit 63, an acquisition unit 64, a processing execution unit 65, and a generation unit 69 by executing the application program 110, for example.

The communication control unit 61 is a processing unit configured to control an operation of communication with, for example, the MFP 10 and the cloud server 90 in cooperation with the communication unit 54, for example.

The input control unit 62 is a control unit configured to control operation input to the operation input unit 56a (e.g., the touch panel 75). For example, the input control unit 62 controls an operation of receiving touch operation input to an operation screen displayed on the touch panel 75.

The display control unit 63 is a processing unit configured to control a display operation of the display unit 56b (e.g., the touch panel 75). For example, the display control unit 63 displays an operation screen for performing cooperative processing with the MFP 10 on the touch panel 75.

Note that the input control unit 62 and the display control unit 63 are also collectively referred to as a "user-interface control unit."

The acquisition unit 64 is a processing unit configured to acquire the scanned image 200 (see FIG. 4) generated by the MFP 10, for example. The acquisition unit 64 receives and acquires the scanned image 200 or the like from the MFP 10 in cooperation with the communication unit 54 and the communication control unit 61, for example.

The processing execution unit 65 is a processing unit configured to execute processing P1 (described below) including a plurality of sub-processes, on the scanned image. The processing execution unit 65 transmits data for causing the cloud server 90 to execute processing P2 (described below) to the cloud server 90. More specifically, when data to be used in the processing P2 (e.g., OCR processing) executed by the cloud server 90 is generated through one of the sub-processes of the processing P1, the processing execution unit 65 transmits this data to the cloud server 90 at a stage where there still remain unexecuted processes (sub-processes) among the plurality of sub-processes. After this data transmission, the processing execution unit 65 continues with the execution of the remaining (unexecuted) processes among the plurality of sub-processes.

The generation unit 69 is a processing unit configured to generate the electronic document 500 (see FIG. 4). The generation unit 69 uses the result (compressed image data) of the processing P1 performed by the processing execution unit 65 and the result (text data serving as the result of OCR processing) of the processing P2 received by, for example, the communication unit 54 and the communication control unit 61 as a basis to generate an electronic document. More specifically, the generation unit 69 generates the electronic document 500 by arranging text information (a group of character codes) of the result of the processing performed on the character area 210 in the character area 210 of the scanned image 200. The electronic document 500 is generated on the basis of image data (highly compressed image data) that has undergone processing such as compressing the character area 210 and the non-character area at their corresponding compression rates.

1-4. Operations

Figure 5:
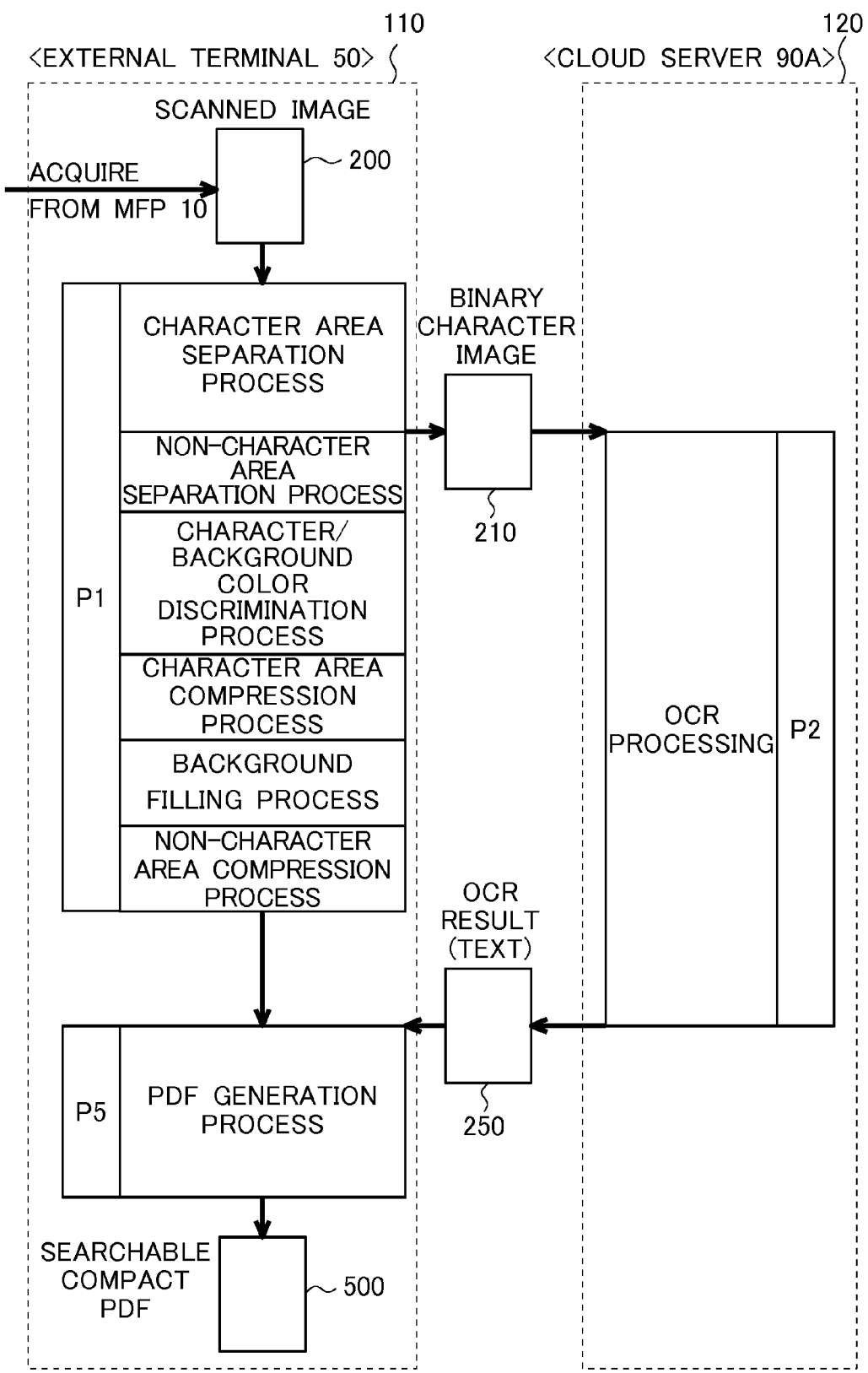
FIG. 5 is a conceptual diagram illustrating an overview of operations performed in the electronic document generation system.

FIG. 4 is a flowchart of operations performed by the external terminal 50 and a cloud server 90 (90A). The external terminal 50 executes processing as illustrated on the left side of FIG. 4 by executing the electronic document generation application 110. The cloud server 90 executes processing as illustrated on the right side of FIG. 4 by executing the application 120. FIG. 5 is a conceptual diagram illustrating an overview of operations performed in the electronic document generation system 1. The operations of the electronic document generation system 1 will now be described with reference to these drawings.

Generation of Scanned Image

First, a user places an original document to be scanned on a document platen (e.g., an automatic document feeder (ADF) or a glass platen for placing documents) of the MFP 10.

The user then operates the external terminal 50 to give an instruction to generate the electronic document 500 to the external terminal 50 and the MFP 10.

More specifically, first, the user designates a device to execute scan processing and a format of the electronic document 500 to be finally generated through the scan processing, on an operation screen (not shown) of the application (electronic document generation application) 110 installed in the external terminal 50. It is assumed here that the MFP 10 is designated as the device to execute scan processing, and searchable compact PDF (compact PDF with invisible text) is designated as the format of the electronic document 500. The user then presses an execution start button (button for starting execution of processing for generating the electronic document 500) displayed on the operation screen of the electronic document generation application 110, so that an instruction to generate the electronic document (here, searchable compact PDF document) 500 is given to the external terminal 50 and the MFP 10.

Note that the searchable compact PDF (invisible text-attached compact PDF) file is an electronic document in a PDF format that has undergone both of the processing (compactness improving processing) that includes a series of sub-processes (e.g., area separation process and compression process) for making the file compact and the OCR processing (also referred to as "searchableness improving processing") for making the file searchable. The searchable compact PDF file is generated as a file that includes an image layer containing a character image and a text layer in which the result of character recognition performed on the character image is embedded without being displayed.

Upon receiving the generation instruction, the external terminal 50 transfers this generation instruction (specifically, for example, an instruction to generate a scanned image in accordance with the generation instruction) to the MFP 10.

Upon receiving the generation instruction (e.g., an instruction to generate a scanned image) from the external terminal 50, the MFP 10 starts a scanning operation to generate the scanned image 200 of the original document placed on the document platen (e.g., ADF) of the MFP 10.

The MFP 10 further performs area discrimination processing for discriminating various types of areas in the scanned image 201. More specifically, the area discrimination unit 15 of the MFP 10 discriminates between the character area 210 (FIG. 6) and the non-character area (e.g., photographic area) 220 in the scanned image 200 and identifies the range (specifically, the position and dimensions) of the character area 210 and the range of the non-character area 220 in the scanned image 200. The area discrimination unit 15 also assigns an identification code (e.g., "1") that indicates that this area is a "character area" to the character area 210. Similarly, the area discrimination unit 15 assigns an area type code (e.g., "2" or "3") that indicates that this area is a "non-character area" to the non-character area 220. To be more specific, for example, "2" is assigned to a photographic area that is the non-character area, and "3" is assigned to a "background area" that is the non-character area.

The area discrimination unit 15 then generates attribute definition data 300 (not shown) on the basis of the above information. The attribute definition data 300 is data generated by assigning the above-described area type code to each pixel position in the scanned image 200 (data in which the area type code is assigned to each pixel in the scanned image 200). In other words, the attribute definition data 300 is generated to include information such as range information (specifically, information regarding the position and dimensions) and the area type code for each of the character area 210 and the non-character area 220 in the scanned image 200.

The MFP 10 (e.g., the communication unit 4 and the communication control unit 11) then transmits the scanned image 200 (specifically, image data of the scanned image) and the attribute definition data 300 to the external terminal 50.

Compactness Improving Processing and OCR Processing

The external terminal 50 acquires (receives) the scanned image 200 and the attribute definition data 300 from the MFP 10 (step S11), and the procedure proceeds to step S13.

In step S13, the external terminal 50 starts processing P1 that includes a series of sub-processes (here, compactness improving processing that includes a series of sub-processes for improving compactness). The compactness improving processing (a series of sub-processes) P1 includes, for example, an area separation process (e.g., a character area separation process and a non-character area separation process such as a background area separation process and a photographic area separation process), an area color determination process (e.g., a character color determination process and a background color determination process), a background filing process, and an area compression process (e.g., a character area compression process and a non-character area compression process such as a background area compression process and a photographic area compression process).

In the present example, the area separation process is a process for separating (extracting) each area from the scanned image to generate a layer (image data) that corresponds to the area. The area separation process includes the character area separation process for separating a character area from the scanned image to generate a character layer (image data of the character area). The area separation process also includes the non-character area separation process for separating a non-character area (e.g., a background area and a photographic area) from the scanned image to generate a non-character layer. To be more specific, the area separation process includes processes such as the background area separation process for separating a background area from the scanned image to generate a background layer (image data of the background area) and a photographic area separation process for separating a photographic area from the scanned image to generate a photographic layer (image data of the photographic area).

The area color determination process is a process for determining the color of each area. The area color determination process includes, for example, the character color determination process for determining the colors of characters in the character area, and a background color determination process for determining the color of the background area.

The background filling process is a process for filling a portion where the character area is present in the background layer (a portion where the character area is arranged) with a background color.

The area compression process is a process for compressing each area using an individual compression method and an individual compression rate. The area compression process includes the character area compression process and the non-character area compression process. The character area compression process is a compression process for compressing the character area using a given compression method (e.g., MMR compression) and a relatively low compression rate. The non-character area compression process is a compression process (e.g., the background area compression process and the photographic area compression process) for compressing the non-character area (e.g., the background area and the photographic area) using another compression method (e.g., JPEG compression) and a relatively high compression rate.

In step S13, the external terminal 50 starts the processing P1 that includes these sub-processes, specifically, the area separation process (more specifically, the character area separation process).

In the character area separation process, the external terminal 50 separates (extracts) the character area of the scanned image 200 on the basis of the scanned image 200 and the attribute definition data 300, and generates a data file in accordance with the input data format of the OCR processing performed by the cloud server 90. This produces an image data file (e.g., binarized image data) of the character area 210 separated (extracted) from the scanned image 200.

When the external terminal 50 has determined that the character area separation process was completed and the image data file was generated as a result of the character area separation process, the external terminal 50 immediately transmits the generated image data file to the cloud server 90 (90A). In other words, when image data to be used in the OCR processing P2 performed by the cloud server 90 has been generated through one (here, the character area separation process) of the plurality of sub-processes of the aforementioned compactness improving processing P1, this image data is sent out (transmitted) to the cloud server 90 at a stage where there still remains unexecuted ones of the sub-processes (step S14). Since this image data is output at a stage in the middle of the processing P1, it is also referred to as "intermediate output data."

In this way, in step S14, the external terminal 50 (e.g., the instruction transmission unit 67) sends out (transmits) the image data of the character area 210 and an instruction (processing request) to perform OCR processing on this image data from the electronic document generation application 110 to the application 120. Note that the application 120 (here, the OCR processing application for performing OCR processing) is an application that is separate from the electronic document generation application 110. The application 120 is installed into and executed by the cloud server 90.

When the application 120 that is being executed by the cloud server 90 has received the aforementioned processing instruction and the image data regarding the character area 210 (step S31), the procedure proceeds to step S32. In step S32, the cloud server 90 (application 120) executes OCR processing on the basis of the processing instruction and the image data. The application 120 then outputs a character string (text data) 250 as a result of the OCR processing to the electronic document generation application 110 (step S33).

In other words, the result of the OCR processing P2 is sent out (transmitted) from the cloud server 90 (application 120) to the external terminal 50 (electronic document generation application 110).

After having transmitted the image data of the character area 210 in step S14, the external terminal 50 (specifically, the processing execution unit 65) continues with the execution of the remaining (unexecuted) ones of the sub-processes. At least some of the remaining processes (e.g., the non-character area separation process, the area color determination process such as the character color determination process and the background color determination process, the background filling process, and the area compression process such as the character area compression process and the non-character area compression process) of the compactness improving processing P1 executed by the external terminal 50 (processing execution unit 65) are executed in parallel with the OCR processing P2 performed by the cloud server 90.

In addition, at least some (e.g., the character area compression process) of the remaining processes of the processing P1 are executed using, for example, the result of the character area separation process (i.e., image data of the character area). In other words, the result of the character area separation process is used in not only the processing P2 (OCR processing) but also processes (subsequent processes) of the processing P1 performed after the character area separation process. That is, the character area separation process can also be referred to as a "common process" that is used in both of the processing P2 and the subsequent processes of the processing P1.

In step S16, the external terminal 50 (e.g., the reception unit 68) receives the result of the processing P2 from the cloud server 90 (application 120).

Then, in step S21, the external terminal 50 (e.g., the generation unit 69) generates the electronic document 500 on the basis of the result of the processing P1 performed by the processing execution unit 65 and the result of the processing P2 received by, for example, the communication unit 54.

More specifically, the electronic document 500 (searchable compact PDF file) to be generated includes images obtained by compressing the character area and the non-character area at different compression rates (i.e., a character area image and a non-character area image that have undergone compression processing using different compression rates) and text data (result of the OCR processing P2).

To be specific, the result of the processing P1 (specifically, data that includes compressed image data 520 of the character area 210, compressed image data 520A of a photographic area 220A, and compressed image data 520B of a background area 220B) is arranged in the electronic document 500. Moreover, the text data 250, which is the result of the OCR processing P2 performed on the character area 210, is arranged at a corresponding position in the electronic document 500 (see also FIG. 6). To be more specific, the text data 250, which is the result of the OCR processing performed on the character area 210, is arranged at a corresponding position of the character area 210 in the text layer (which is not displayed) of the compact searchable PDF file (i.e., in a corresponding area 510 of the electronic document 500). In other words, the text data 250, which is the processing result (OCR processing result) of the character area 210, is embedded at the position where the partial area 230 is detected, without being displayed.

Figure 6:
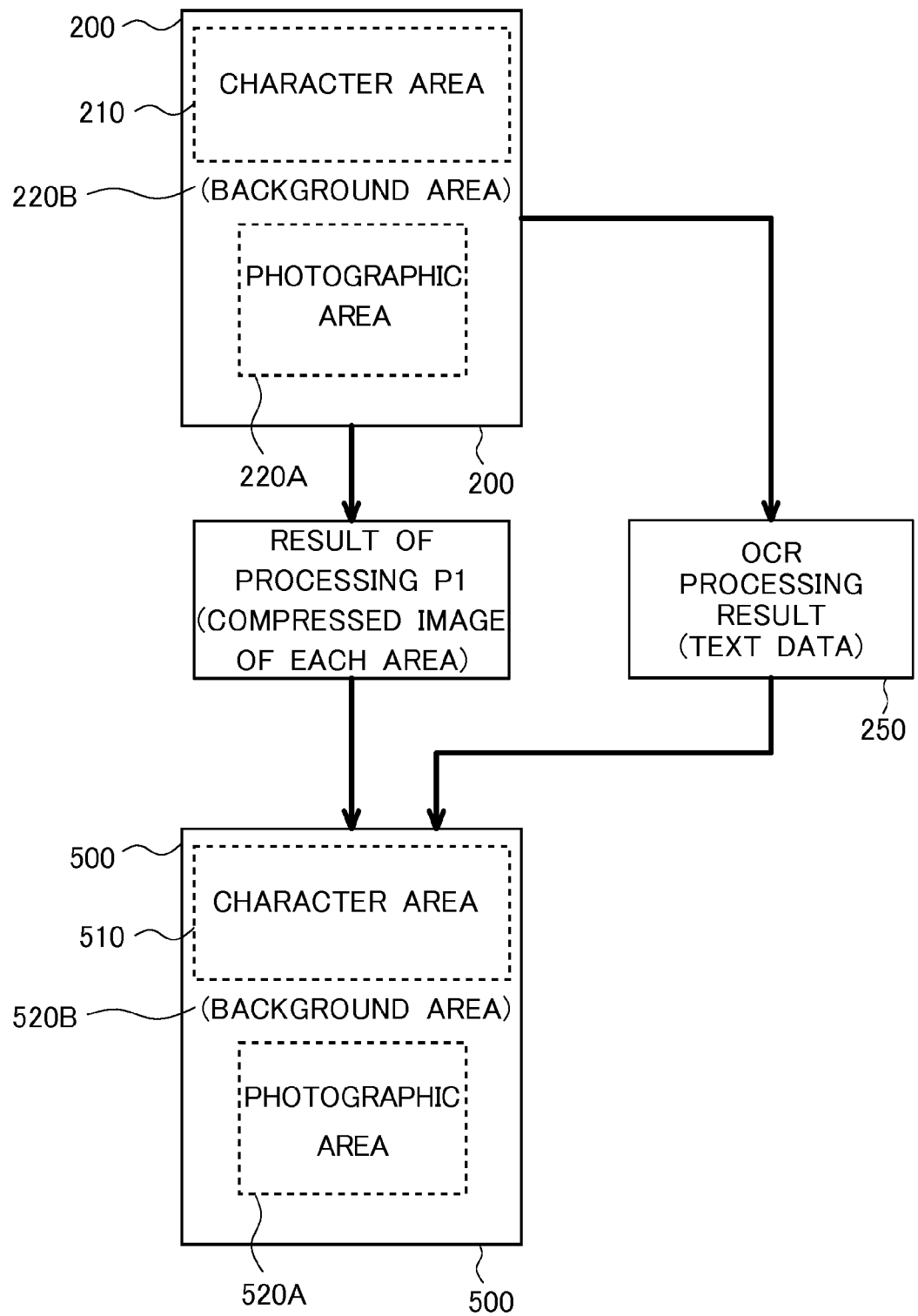
FIG. 6 illustrates a scanned image and an electronic document.

In this way, the electronic document (searchable compact PDF file) 500 is generated (see also FIG. 6).

As described above, in the first embodiment, the data to be used in the OCR processing (searchableness improving processing) P2 performed by the cloud server 90 is generated by the external terminal 50 through a specific process (here, the character area separation process), which is one of the plurality of sub-processes of the processing P1 (compactness improving processing). In response to this, the external terminal 50 executes the following processing in the middle of the processing P1 (at a stage where there still remain unexecuted ones of the sub-processes). More specifically, the external terminal 50 executes transmission processing for transmitting the generated data to the cloud server 90 (step S14), and after the data transmission, continues with the execution of the remaining (unexecuted) ones of the sub-processes (of the compactness improving processing P1) (step S15). The external terminal 50 then generates an electronic document on the basis of the result of the processing P1 executed by the external terminal 50 and the result of the processing P2 executed on the above data by the cloud server 90 (step S21).

In this case, the data (character-area image data) to be used in the OCR processing P2 is transmitted to the cloud server 90 in the middle of the compactness improving processing P1. It is thus possible for the cloud server 90 to start the execution of the OCR processing P2 without waiting for the completion of the compactness improving processing P1. This improves processing efficiency. In other words, the efficiency of generating an electronic document can be further improved in the technique in which a plurality of apparatuses cooperate to generate an electronic document.

In addition, the processing P2, which is started by the cloud server 90 in response to the transmission of the data (character-area image data) from the external terminal 50 to the cloud server 90, is executed in parallel with at least part of the remaining processes of the compactness improving processing P1. This further improves processing efficiency.

In particular, for improvement in processing efficiency, the focus is on using the result of a specific process (specifically, the character area separation process) in both of the subsequent processes (e.g., the character area compression process) of the processing P1 and the processing (OCR processing) P2 separate from the processing P1. Specifically, the external terminal 50 transmits the result of the specific process to the cloud server 90 in the middle of the processing P1 (specifically, immediately after the completion of the specific process) without waiting for the completion of the processing P1 so as to allow the cloud server 90 to execute the OCR processing P2. On the other hand, the external terminal 50 itself uses the result of the specific process to continue with the execution of the remaining processes, which are performed after the specific process. Consequently, the cloud server 90 can start the execution of the OCR processing P2 without waiting for the completion of the compactness improving processing P1 and can execute the OCR processing P2 in parallel with at least some of the remaining processes of the compactness improving processing P1, which are performed after the specific process. It is thus possible to improve processing efficiently.

The above-described embodiment uses the OCR processing service provided by an apparatus (cloud server 90) outside the MFP 10. This allows OCR processing to be performed by an apparatus (cloud server) different from the client apparatus (e.g., the external terminal 50) that has requested the execution of the OCR processing. It is thus possible to reduce the processing load on the client apparatus.

In the above-described embodiment, the attribute definition data 300 generated by the MFP 10 is transmitted to the external terminal 50 and used as a basis by the external terminal 50 to execute the area separation process. By using the attribute definition data 300 generated in advance by the MFP 10 in the area separation process executed by the external terminal 50, it is possible to reduce the processing load of the area separation process on the external terminal 50. The present invention is, however, not limited to this example, and the attribute definition data 300 may be generated by the external terminal 50. As another alternative, the area separation process may be performed without the generation of the attribute definition data 300.

2. Second Embodiment

A second embodiment is a variation of the first embodiment. The following description focuses on differences from the first embodiment.

Figure 8:
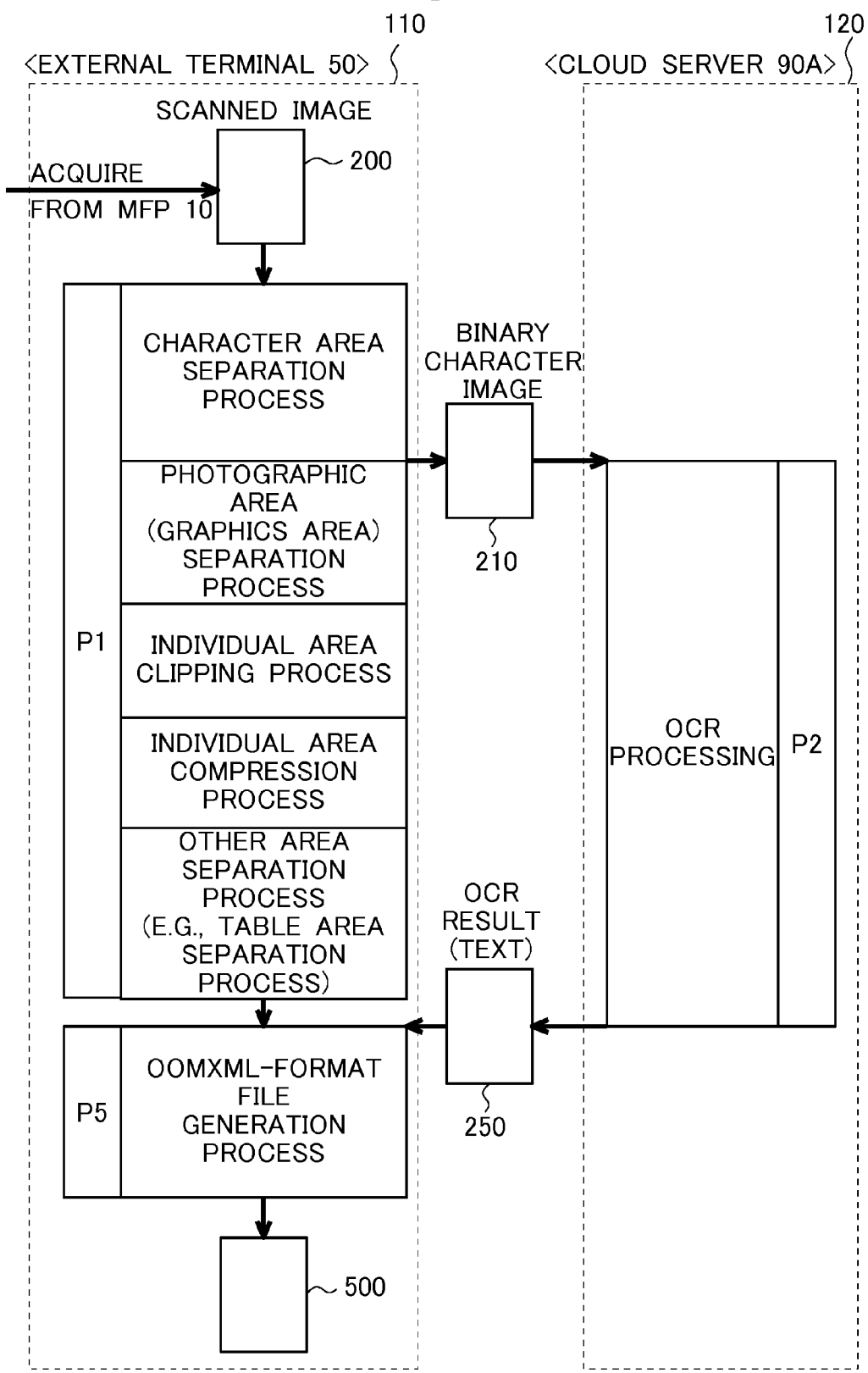
FIG. 8 is a conceptual diagram illustrating an overview of operations according to a second embodiment.

Although a searchable compact PDF file is generated on the basis of a scanned image in the above-described first embodiment, the second embodiment takes the example of the case where an office open extensible markup language (OOXML) file is generated on the basis of a scanned image (see FIG. 8). FIG. 8 is a conceptual diagram illustrating an overview of operations according to the second embodiment.

In the generation of an OOXML file, the external terminal 50 executes a character area separation process, a photographic area separation process, an other area separation process (e.g., a table area separation process), an individual area clipping process, and an individual area compression process. On the other hand, the cloud server 90 performs OCR processing and transmits the result of the OCR processing to the external terminal 50. Text data (a group of character codes) that is the result of the OCR processing is also added to the OOXML file.

In the second embodiment, the same operations as in FIG. 4 are executed. It is, however, noted that processing P1 of the second embodiment is different processing from the compactness improving processing of the first embodiment. The processing P1 of the second embodiment contains the following plurality of sub-processes. The plurality of sub-processes include a character area separation process, a photographic area separation process, an other area separation process (table area separation process), an individual area clipping process (related to a photographic area), and an individual area compression process.

Figure 7:
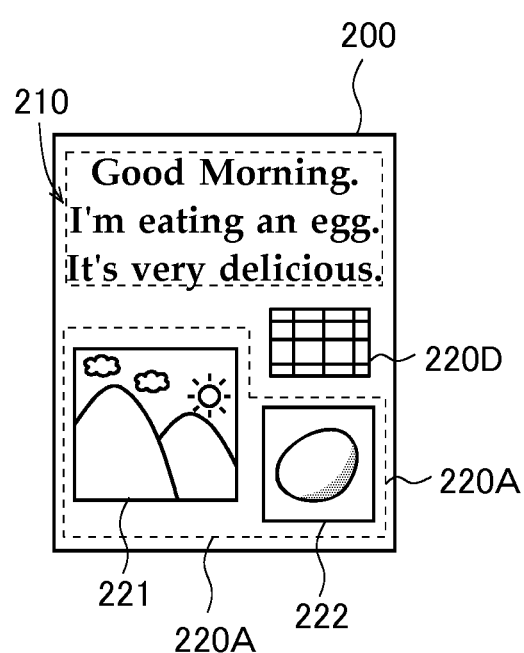
FIG. 7 illustrates a scanned image.

Here, the photographic area separation process is a process for separating a photographic area (including a graphics area) 220A (see FIG. 7) from the scanned image 200, and the other area separation process (table area separation process) is a process (specific area separation process) for separating the other area (specifically, a specific type of area such as a table area 220D that is different from the character area and the photographic area) from the scanned image 200. The photographic area separation process generates photographic-area image data regarding the separated photographic area 220A, and the other area separation process generates other-area image data (e.g., table-area image data) regarding the separated other area. The individual area clipping process is a process for clipping each of a plurality of sub-areas (individual photographic areas) 221 and 222 included in the photographic area 220A from the photographic-area image data generated by the photographic area separation process. The individual area compression process is a compression process for compressing the individual areas 221 and 222 clipped by the individual area clipping process in a predetermined format (e.g., a JPEG format).

In the second embodiment, when the first sub-process (specifically, the character area separation process for separating and extracting the character area 210 from the scanned image) has been completed in step S14 (FIG. 4), the character-area image data (image data of the character area 210) is transmitted as the result of the processing to the cloud server 90. The image data of the character area 210 is transmitted together with an instruction (processing request) to perform the OCR processing P2 to the cloud server 90 (90A).

After the transmission of the image data of the character area 210 in step S14, the external terminal 50 continues with the execution of the remaining (unexecuted) one of the sub-processes (step S15). All or some of the remaining processes of the processing P1 (e.g., the photographic area separation process, the individual area clipping process (in the photographic area), the individual area compression process, and other area separation process such as the table area separation process) are executed in parallel with the OCR processing P2 performed by the cloud server 90.

Thereafter, upon reception of the result of the OCR processing P2 from the cloud server 90 (90A) in step S16, the external terminal 50 generates the electronic document 500 on the basis of the results of the processing P1 and the processing P2 in step S21. More specifically, the external terminal 50 generates the electronic document (electronic document in an OOXML format) that includes the photographic area (a plurality of individual photographic areas) and the text data (result of the OCR processing). This generation processing uses both of the result of the processing P1 (e.g., the image data of the character area 210, the image data of the photographic area 220A, and the image data of the table area 220D) and the result of the OCR processing P2 (text data).

In the above-described embodiment, the data (image data of the character area) to be used in the OCR processing P2 is transmitted to the cloud server 90 in the middle of the compactness improving processing P1 as in the first embodiment. It is thus possible for the cloud server 90 to start the execution of the OCR processing P2 without waiting for the completion of the compactness improving processing P1. This improves processing efficiency. In other words, the efficiency of generating an electronic document can be further improved in the technique in which a plurality of apparatuses cooperate to generate an electronic document.

In addition, the cloud server 90 can execute the OCR processing P2 in parallel with at least some of sub-processes of the processing P1 without waiting for the completion of the processing P1. It is thus possible to improve processing efficiency.

3. Third Embodiment

A third embodiment is a variation of the second embodiment. The following description focuses on differences from the second embodiment.

In this third embodiment, not only the OCR processing P2 but also some processes (the individual area clipping process and the individual area compression process) of the processing P1 are executed by an apparatus different from the external terminal 50. Here, the OCR processing P2 is executed by the cloud server 90A, and the some processes (the individual area clipping process and the individual area compression process) are executed by the cloud server 90B.

The cloud server 90B has installed therein an application 130 for executing the individual area clipping process for clipping an individual area from the photographic area and the individual area compression process for compressing the individual area in a JPEG format. The cloud server 90B uses this application 130 to execute the individual area clipping process and the individual area compression process (JPEG compression process).

In the third embodiment, the same operations as in FIG. 4, excluding step S21, are executed. To be specific, the external terminal 50 executes the processes up to step S16 in FIG. 4, and the cloud server 90 executes the corresponding processes (steps S31 to S33). After step S16, operations in FIG. 9 are executed.

Figure 9:
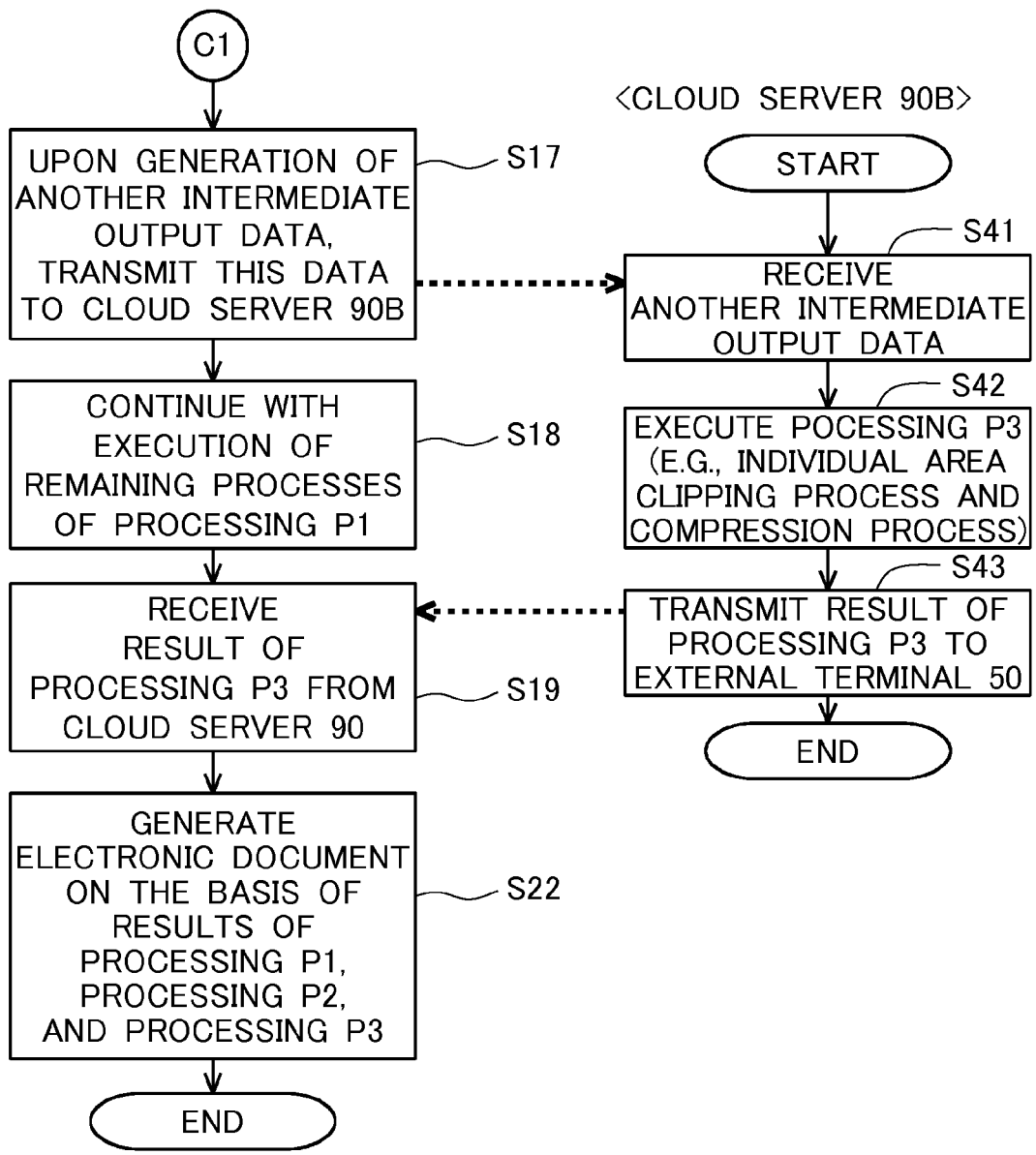
FIG. 9 is a flowchart of operations performed by the external terminal and the cloud server.
Figure 10:
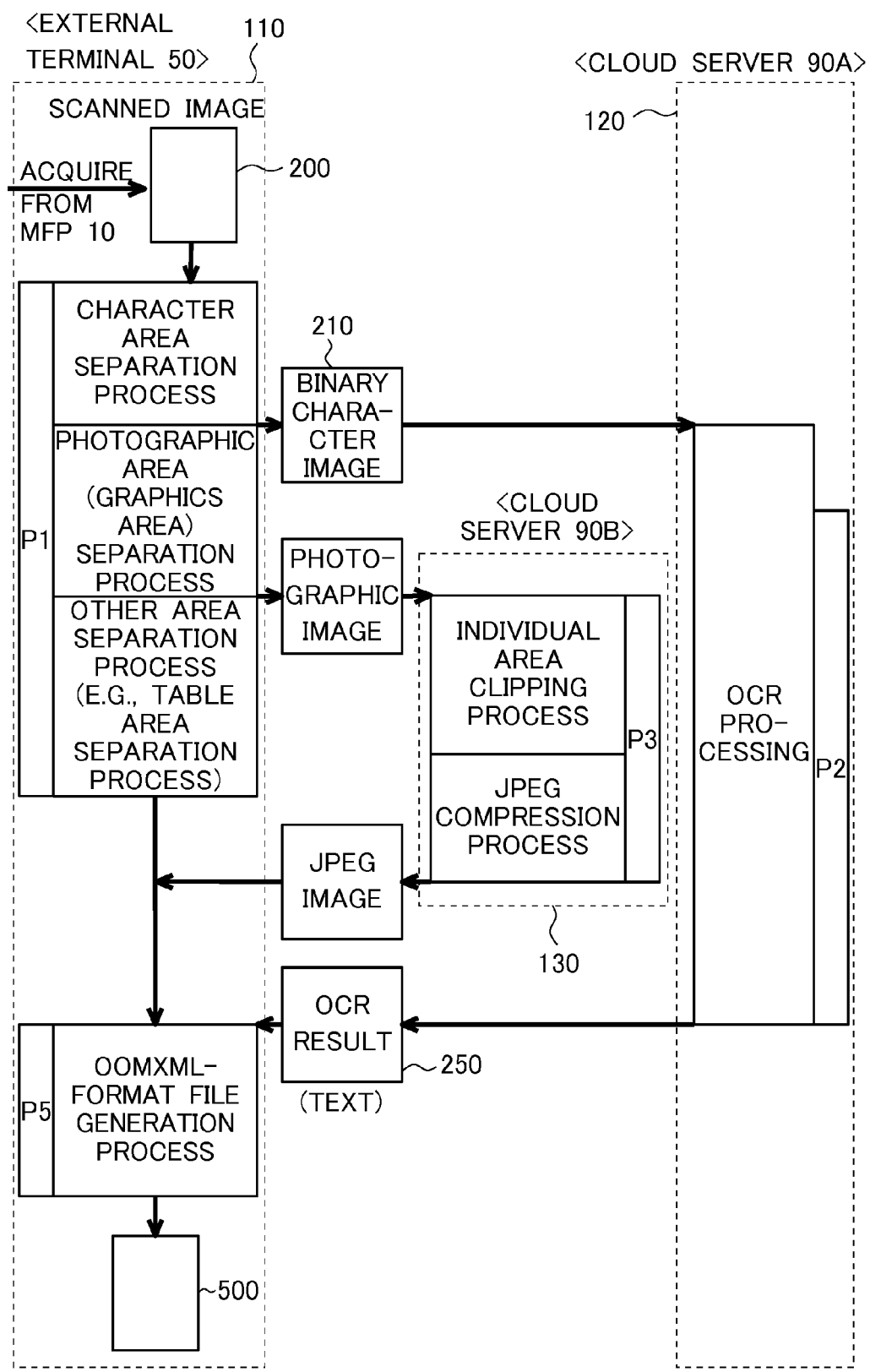
FIG. 10 is a conceptual diagram illustrating an overview of operations according to a third embodiment.

FIG. 9 is a flowchart of operations performed by the external terminal 50 and the cloud server 90 (90B). The external terminal 50 executes the electronic document generation application 110 to execute processes as illustrated on the left side of FIG. 9 after the process of step S16. The cloud server 90B executes the application 130 to execute processes as illustrated on the right side of FIG. 9. FIG. 10 is a conceptual diagram illustrating an overview of operations according to the third embodiment.

The processing P1 of the third embodiment contains the following plurality of sub-processes. The sub-processes include a character area separation process, a photographic area separation process, and an other area separation process (table-area separation process). The processing P1 of the third embodiment does not include an individual area clipping process and an individual area compression process.

When the first sub-process (specifically, the character area separation process for separating and extracting the character area 210 from the scanned image) of the processing P1 has been completed in step S14, image data (image data of the character area 210) is transmitted as the result of the processing to the cloud server 90A.

After the transmission of step S14, the external terminal 50 continues with the execution of the remaining (unexecuted) ones (e.g., the photographic area separation process) of the plurality of sub-processes in step S15.

The external terminal 50 then completes a predetermined sub-process (specifically, the photographic area separation process for separating and extracting a photographic area from the scanned image) of the processing P1 and transmits photographic-area image data (image data of the photographic area) as the result of the processing to the cloud server 90B in step S17. The photographic-area image data is transmitted together with an instruction (processing request) to perform processing P3 (the individual area clipping process and the individual area compression process) from the external terminal 50 to the cloud server 90B.

After the transmission of step S17, the external terminal 50 continues with the execution of the remaining (unexecuted) ones of the plurality of sub-processes (step S18).

Here, all or some (e.g., the photographic area separation process) of the remaining processes of the processing P1 that are performed after the character area separation process are executed in parallel with the OCR processing P2 performed by the cloud server 90.

In addition, all or some (e.g., the table area separation process) of the remaining processes of the processing P1 that are performed after the photographic area separation process are executed in parallel with the processing P3 performed by the cloud server 90.

Meanwhile, when the application 130 that is being executed by the cloud server 90B has received the aforementioned processing instruction and image data of the photographic area transmitted from the external terminal 50 in step S17 (step S41), the procedure proceeds to step S42. In step S42, the cloud server 90B (application 130) executes the processing P3 (the individual area clipping process and the individual area compression process) on the basis of the processing instruction and the image data. The application 130 then outputs image data (compressed image data of each individual area) regarding the result of processing P3 to the electronic document generation application 110 (step S43). In other words, the result of the processing P3 is sent out (transmitted) from the cloud server 90B (application 130) to the external terminal 50 (electronic document generation application 110).

Thereafter, in step S22, the external terminal 50 generates the electronic document 500 on the basis of the processing result received from the cloud server 90A in step S16 (the result of the OCR processing), the processing result received from the cloud server 90B in step S19 (the result of the processing P3), and the result of the processing P1 executed by the external terminal 50 itself (e.g., the image data of the table area). To be specific, the external terminal 50 generates the electronic document (electronic document in an OOXML format) that includes the table area, a plurality of individual photographic areas, and text data (the result of OCR processing).

In the above-described embodiment, the cloud server 90 can execute the OCR processing P2 and the processing P3 in parallel with at least some of the processes of the processing P1 without waiting for the completion of the processing P1. It is thus possible to improve processing efficiency.

For convenience of illustration, the result of the OCR processing P2 is received before step S17 in FIG. 9, but the present invention is not limited to this example. For example, the result of the OCR processing P2 may be received at any appropriate point in time in step S17 or a subsequent step (e.g., at a point in time after step S19). In particular, processing efficiency can be further improved by allowing a plurality of different cloud servers 90A and 90B to execute the processing P2 and the processing P3 in parallel.

4. Variations

While the above has been a description of embodiments of the present invention, the present invention is not intended to be limited to the examples described above.

For example, while the image data for OCR processing is transmitted in units of pages from the external terminal 50 to the cloud server 90 in the above-described embodiments, the present invention is not limited to this example. More specifically, the external terminal 50 may use smaller units than the page units, such as units of paragraph or row, to extract partial image data through image processing, for example, and transmit each piece of such partial image data to the cloud server 90. Then, the cloud server 90 may also use such units to perform OCR processing, for example, and transmit the result of the OCR processing to the external terminal 50.

Figure 11:
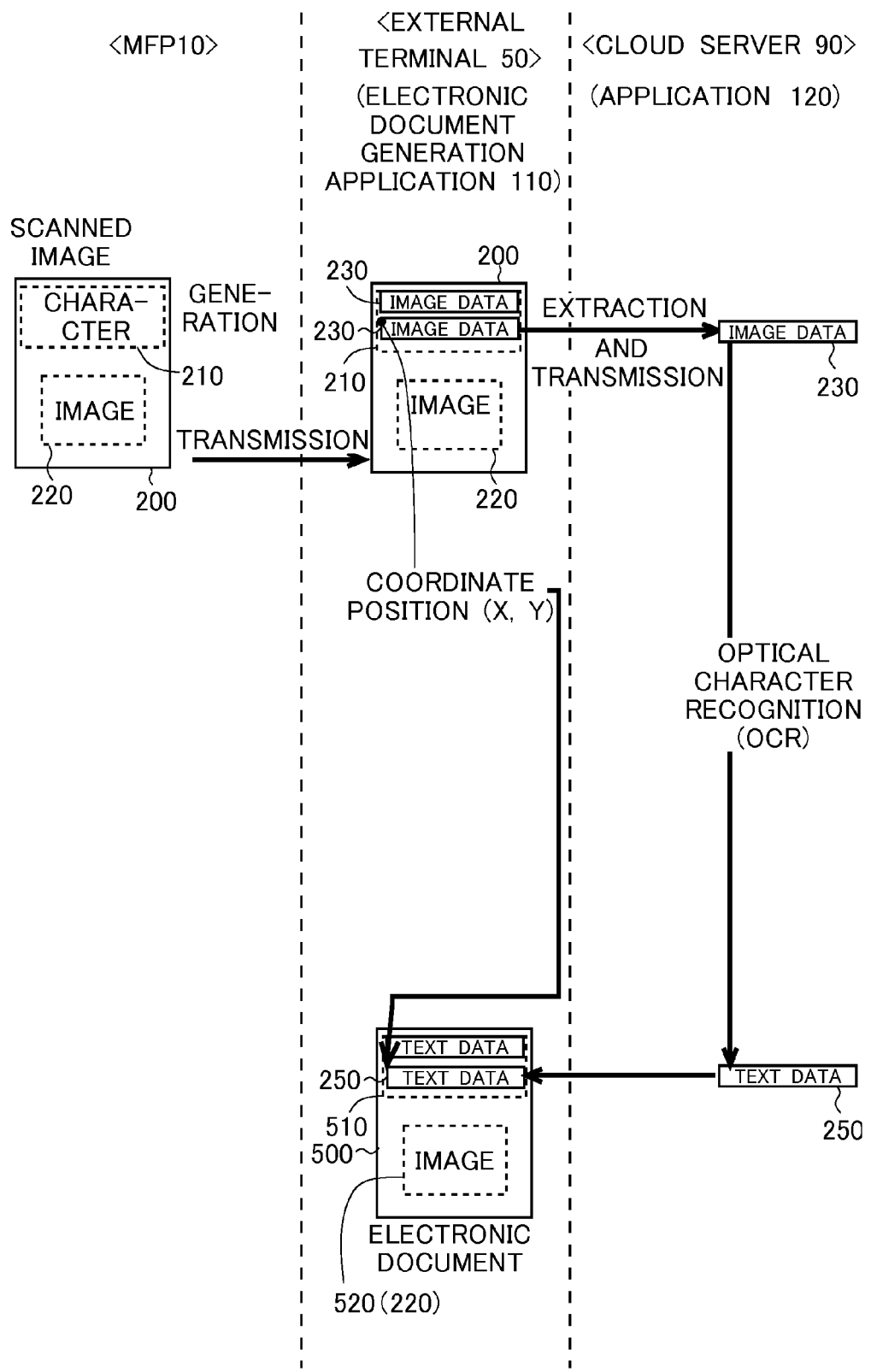
FIG. 11 illustrates a variation.

FIG. 11 illustrates an example of such a variation. FIG. 11 illustrates the example in which the cloud server 90 executes OCR processing on each of a plurality of partial areas (e.g., row areas) 230 in the character area 210. Then, text data 250 is arranged as the result of the OCR processing for each partial area in a corresponding area 510 (area that corresponds to the character area 210) of the electronic document 500. In particular, the external terminal 50 detects the position (detected position) (X, Y) of each row area in the scanned image 200 in advance and then arranges the OCR processing result for each row area at the corresponding detected position (X, Y) in the electronic document 500. This allows the OCR processing result for each row to be arranged at an accurate position. In this case, preferably, a plurality of image data files regarding a plurality of partial areas 230 respectively have file names that each include an identifier for identifying the partial area, and are exchanged between the external terminal 50 and the cloud server 90. The same applies to text files that indicate the results of the OCR processing performed on the plurality of image data files. The text files preferably respectively have file names that each include an identifier for identifying the partial area, and are exchanged between the external terminal 50 and the cloud server 90. This makes it possible to discriminate among a plurality of partial areas (and their respective OCR processing results) while executing the OCR processing on each of the partial areas in parallel.

While the OCR processing is executed as the processing P2 by the cloud server 90 (90A) in the above-described embodiments, the present invention is not limited to this example, and the cloud server 90 (90A) may execute translation processing as the processing P2, instead of (or in addition to) the OCR processing. To be more specific, a configuration is possible in which the external terminal 50 (or the MFP 10) executes OCR processing on a scanned image and transmits text data as the result of the OCR processing to the cloud server 90, and the cloud server 90 executes translation processing on the text data. Then, the external terminal 50 may generate an electronic document on the basis of the result of the translation processing. Alternatively, the cloud server 90 may execute both of the OCR processing and the translation processing, and the external terminal 50 may generate an electronic document on the basis of the results of the OCR processing and the translation processing.

Alternatively, the cloud server 90 may execute image search processing as the processing P2. More specifically, a configuration is possible in which the external terminal 50 (or the MFP 10) executes OCR processing on a scanned image and transmit part (e.g., a designated character string) of text data as the result of the OCR processing to the cloud server 90, and the cloud server 90 executes image search processing using the designated character string as a search keyword. Then, the external terminal 50 may generate an electronic document on the basis of the result of the image search processing. To be more specific, the external terminal 50 may generate an electronic document in which an image transmitted as the result of the image search processing from the cloud server 90 is arranged at a position in the vicinity of the search keyword.

Alternatively, a process for compressing a character image may be executed as the processing P2.

As another alternative, the processing P2 may, for example, be image processing (e.g., edge enhancement processing and/or density adjustment processing) performed as pre-processing of OCR processing, or may be image processing that is performed irrespective of the OCR processing. The processing P2 may also include other processing such as expanding a character image, which has been transmitted in a compressed format.

The processing P2 may also be image processing to be performed on a photographic image (e.g., smoothing processing, color conversion processing, or tone reproduction processing), or may be processing for compressing a photographic image. Alternatively, the processing P2 may include, for example, processing for expanding a photographic image, which has been transmitted in a compressed format.

While the above-described embodiments take the example of the case where the scanned image generated by the MFP 10 is transmitted to the external terminal 50, and the external terminal 50 requests the other cloud server 90 to perform the processing P2 (P3) on the scanned image, the present invention is not limited to this example.

Figure 12:
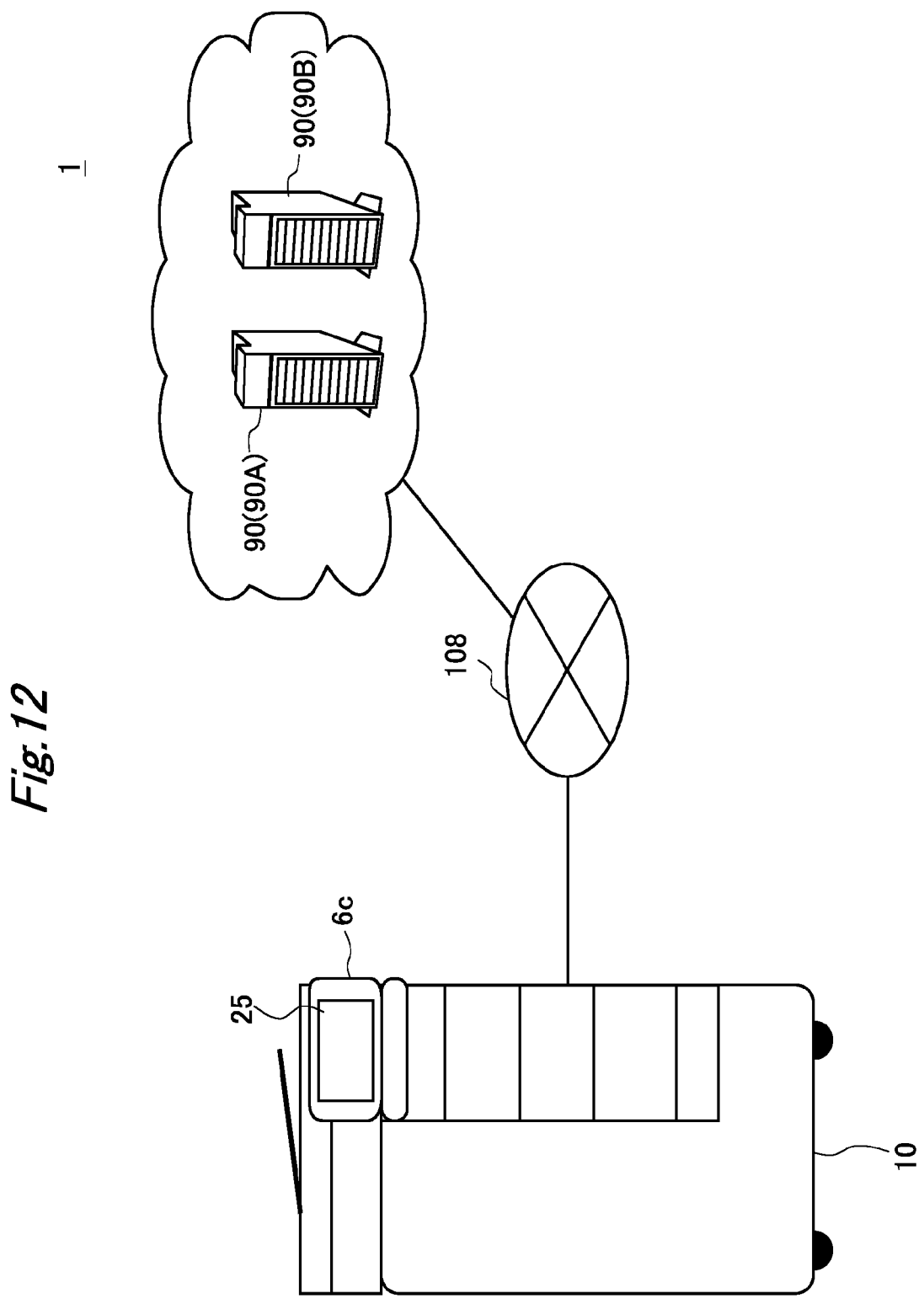
FIG. 12 illustrates another system configuration.

For example, the operations of the external terminal 50 in the above-described embodiments may be executed by the MFP 10 in a system 1 (see FIG. 12) that does not includes the external terminal 50 but includes the MFP 10 and the cloud server 90. To be more specific, the MFP 10 may execute the processing P1, and the cloud server 90 may execute the processing P2 (P3).

Figure 13:
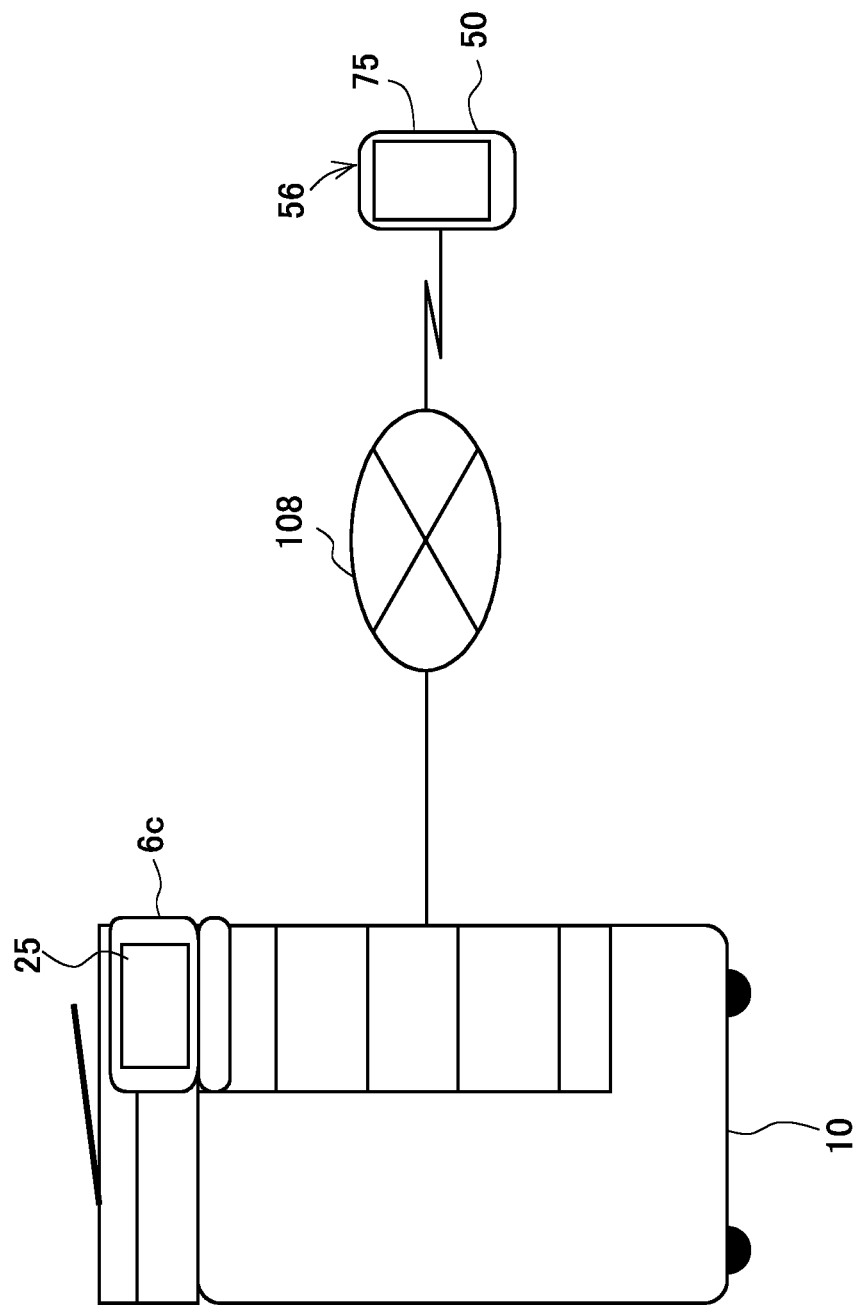
FIG. 13 illustrates yet another system configuration.

As another alternative, the operations of the external terminal 50 in the above-described embodiments may be executed by the MFP 10, and the operations (e.g., OCR processing) of the cloud server 90 in the above-described embodiments may be executed by the external terminal 50 in a system (see FIG. 13) that does not includes the cloud server 90 but includes the MFP 10 and the external terminal 50. To be more specific, the MFP 10 may execute the processing P1, and the external terminal 50 may execute the processing P2 (P3).

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An electronic document generation system for generating an electronic document, comprising;
a first apparatus configured to execute first processing for generating an electronic document on the basis of a scanned image of an original document; and
a second apparatus configured to execute second processing for generating the electronic document in response to a request received from the first apparatus and transmit a result of the second processing to the first apparatus,
the first apparatus including:
a processing execution unit configured to execute the first processing, the processing execution unit being configured to, when data to be used in the second processing is generated by one of a plurality of sub-processes of the first processing, transmit the data to the second apparatus at a stage where there is a remaining unexecuted process among the plurality of sub-processes, and continue with execution of the remaining unexecuted process among the plurality of sub-processes;
a reception unit configured to receive a result of the second processing executed on the data by the second apparatus, from the second apparatus; and
a generation unit configured to generate the electronic document on the basis of the result of the first processing executed by the processing execution unit and the result of the second processing received by the reception unit;
wherein the first processing includes a character area separation process for separating a character area from the scanned image, a non-character area separation process for separating a non-character area from the scanned image, a first compression process to be performed on the character area, and a second compression process to be performed on the non-character area,
the second processing includes an optical character recognition process to be performed on the character area,
the processing execution unit is configured to, when character-area image data to be used in the second processing is generated by the character area separation process among the plurality of sub-processes, transmit the character-area image data to the second apparatus, and continue with execution of the remaining unexecuted process that is to be performed after the character area separation process among the plurality of sub-processes,
the reception unit is configured to receive the result of the second processing that is executed by the second apparatus in parallel with at least one of the remaining unexecuted process executed by the processing execution unit, from the second apparatus, and
the generation unit is configured to generate the electronic document on the basis of the result of the first processing executed by the processing execution unit and the result of the second processing received by the reception unit, the electronic document including images obtained by compressing the character area and the non-character area at different compression rates and including text data regarding a result of the optical character recognition process.

2. The electronic document generation system according to claim 1, wherein
the first apparatus is an information terminal, and
the second apparatus is a server.

3. The electronic document generation system according to claim 1, wherein
the first apparatus is an image forming apparatus, and
the second apparatus is a server.

4. The electronic document generation system according to claim 1, wherein
the first apparatus is an image forming apparatus, and
the second apparatus is an information terminal.

5. An electronic document generation system for generating an electronic document, comprising;
a first apparatus configured to execute first processing for generating an electronic document on the basis of a scanned image of an original document; and
a second apparatus configured to execute second processing for generating the electronic document in response to a request received from the first apparatus and transmit a result of the second processing to the first apparatus,
the first apparatus including:
a processing execution unit configured to execute the first processing, the processing execution unit being configured to, when data to be used in the second processing is generated by one of a plurality of sub-processes of the first processing, transmit the data to the second apparatus at a stage where there is a remaining unexecuted process among the plurality of sub-processes, and continue with execution of the remaining unexecuted process among the plurality of sub-processes;
a reception unit configured to receive a result of the second processing executed on the data by the second apparatus, from the second apparatus; and
a generation unit configured to generate the electronic document on the basis of the result of the first processing executed by the processing execution unit and the result of the second processing received by the reception unit;

wherein the first processing includes a character area separation process for separating a character area from the scanned image, and a photographic area separation process for separating a photographic area from the scanned image to generate photographic-area image data, the second processing includes an optical character recognition process to be performed on the character area, the processing execution unit is configured to, when character-area image data to be used in the second processing is generated by the character area separation process among the plurality of sub-processes, transmit the character-area image data to the second apparatus, and continue with execution of the remaining unexecuted processing that is performed after the character area separation process among the plurality of sub-processes, the reception unit is configured to receive the result of the second processing executed by the second apparatus in parallel with at least one of the remaining unexecuted process executed by the processing execution unit, from the second apparatus, and the generation unit is configured to generate the electronic document on the basis of the result of the first processing executed by the processing execution unit and the result of the second processing received by the reception unit, the electronic document including the photographic area and text data regarding a result of the optical character recognition process.

6. The electronic document generation system according to claim 5, further comprising:

a third apparatus configured to execute third processing for generating the electronic document in response to a request received from the first apparatus and transmit a result of the third processing to the first apparatus, wherein the first processing further includes a specific area separation process for separating a specific type of area that is different from the character area and the photographic area from the scanned image, the third processing includes an individual area clipping process for clipping each of a plurality of individual photographic areas from the photographic-area image data that includes the plurality of individual photographic areas, the processing execution unit is configured to, when the photographic-area image data to be used in the third processing is generated by the photographic area separation process among the plurality of sub-processes, transmit the photographic-area image data to the third apparatus and continue with execution of the remaining unexecuted processing that is performed after the photographic area separation process among the plurality of sub-processes, the reception unit is configured to receive the result of the third processing that is executed by the third apparatus in parallel with at least one of the remaining unexecuted process performed after the photographic area separation process, from the third apparatus, and the generation unit is configured to generate the electronic document on the basis of the result of the first processing executed by the processing execution unit, the result of the second processing received by the reception unit, and the result of the third processing received by the reception unit, the electronic document including the specific type of area, the plurality of individual photographic areas, and text data regarding a result of the optical character recognition process.

7. The electronic document generation system according to claim 5, wherein the first apparatus is an information terminal, and
the second apparatus is a server.

8. The electronic document generation system according to claim 5, wherein the first apparatus is an image forming apparatus, and
the second apparatus is a server.

9. The electronic document generation system according to claim 5, wherein the first apparatus is an image forming apparatus, and
the second apparatus is an information terminal.

10. An electronic document generation apparatus for generating an electronic document in cooperation with a cooperative apparatus, comprising;

a processing execution unit configured to execute first processing for generating an electronic document on the basis of a scanned image of an original document, the processing execution unit being configured to, when data to be used in second processing executed by the cooperative apparatus is generated by one of a plurality of sub-processes of the first processing, transmit the data to the cooperative apparatus at a stage where there is a remaining unexecuted process among the plurality of sub-processes, and continue with execution of the remaining unexecuted process among the plurality of sub-processes;

a reception unit configured to receive a result of the second processing executed on the data by the cooperative apparatus, from the cooperative apparatus; and a generation unit configured to generate the electronic document on the basis of a result of the first processing executed by the processing execution unit and the result of the second processing received by the reception unit;

wherein the first processing includes a character area separation process for separating a character area from the scanned image, a non-character area separation process for separating a non-character area from the scanned image, a first compression process to be performed on the character area, and second compression process to be performed on the non-character area, the second processing includes an optical character recognition process to be performed on the character area, the processing execution unit is configured to, when character-area image data to be used in the second processing is generated by the character area separation process among the plurality of sub-processes, transmit the character-area image data to the cooperative apparatus and continue with execution of the remaining unexecuted process that is performed after the character area separation process among the plurality of sub-processes, the reception unit is configured to receive the result of the second processing that is executed by the cooperative apparatus in parallel with at least one of the remaining unexecuted process executed by the processing execution unit, from the cooperative apparatus, and the generation unit is configured to generate the electronic document on the basis of the result of the first processing executed by the processing execution unit and the result of the second processing received by the reception unit, the electronic document including images obtained by compressing the character area and the non-character area at different compression rates and including text data regarding a result of the optical character recognition process.

11. The electronic document generation apparatus according to claim 10, wherein
the electronic document generation apparatus is an information terminal.

12. The electronic document generation apparatus according to claim 10, wherein
the electronic document generation apparatus is an image forming apparatus.

13. An electronic document generation apparatus for generating an electronic document in cooperation with a cooperative apparatus, comprising;
a processing execution unit configured to execute first processing for generating an electronic document on the basis of a scanned image of an original document, the processing execution unit being configured to, when data to be used in second processing executed by the cooperative apparatus is generated by one of a plurality of sub-processes of the first processing, transmit the data to the cooperative apparatus at a stage where there is a remaining unexecuted process among the plurality of sub-processes, and continue with execution of the remaining unexecuted process among the plurality of sub-processes;
a reception unit configured to receive a result of the second processing executed on the data by the cooperative apparatus, from the cooperative apparatus; and
a generation unit configured to generate the electronic document on the basis of a result of the first processing executed by the processing execution unit and the result of the second processing received by the reception unit;
wherein the first processing includes a character area separation process for separating a character area from the scanned image and a photographic area separation process for separating a photographic area from the scanned image to generate photographic-area image data,
the second processing includes an optical character recognition process to be performed on the character area,
the processing execution unit is configured to, when character-area image data to be used in the second processing is generated by the character area separation process among the plurality of sub-processes, transmit the character-area image data to the cooperative apparatus and continue with execution of the remaining unexecuted process that is performed after the character area separation process among the plurality of sub-processes,
the reception unit is configured to receive the result of the second processing that is executed by the cooperative apparatus in parallel with at least one of the remaining unexecuted process executed by the processing execution unit, from the cooperative apparatus, and
the generation unit is configured to generate the electronic document on the basis of the result of the first processing executed by the processing execution unit and the result of the second processing received by the reception unit, the electronic document including the photographic area and text data regarding a result of the optical character recognition process.

14. The electronic document generation apparatus according to claim 13, wherein
the processing execution unit is configured to request another cooperative apparatus different from the cooperative apparatus to execute third processing for generating the electronic document,
the first processing further includes a specific area separation process for separating a specific type of area that is different from the character area and the photographic area from the scanned image,
the third processing includes an individual area clipping process for clipping each of a plurality of individual photographic areas from the photographic-area image data that includes the plurality of individual photographic areas,
the processing execution unit is configured to, when the photographic-area image data to be used in the third processing is generated by the photographic area separation process among the plurality of sub-processes, transmit the photographic-area image data to the other cooperative apparatus and continue with execution of the remaining unexecuted process that is performed after the photographic area separation process among the plurality of sub-processes,
the reception unit is configured to receive a result of the third processing that is executed by the other cooperative apparatus in parallel with at least one of the remaining unexecuted process performed after the photographic area separation process, from the other cooperative apparatus, and
the generation unit is configured to generate the electronic document on the basis of the result of the first processing executed by the processing execution unit, the result of the second processing received by the reception unit, and the result of the third processing received by the reception unit, the electronic document including the specific types of area, the plurality of individual photographic areas, and text data regarding a result of the optical character recognition process.

15. The electronic document generation apparatus according to claim 13, wherein
the electronic document generation apparatus is an information terminal.

16. The electronic document generation apparatus according to claim 13, wherein
the electronic document generation apparatus is an image forming apparatus.

17. A non-transitory computer-readable recording medium that stores a program for causing a computer that is built into an electronic document generation apparatus for generating an electronic document in cooperation with a cooperative apparatus, to execute:
a) starting first processing for generating an electronic document on the basis of a scanned image of an original document;
b) when data to be used in second processing executed by the cooperative apparatus is generated by one of a plurality of sub-processes of the first processing, transmitting the data to the cooperative apparatus at a stage where there is a remaining unexecuted process among the plurality of sub-processes, and continuing with execution of the remaining unexecuted process among the plurality of sub-processes;
c) receiving a result of the second processing executed on the data by the cooperative apparatus, from the cooperative apparatus; and
d) generating the electronic document on the basis of a result of the first processing executed by the electronic document generation apparatus and the result of the second processing received in the step c);

wherein the first processing includes a character area separation process for separating a character area from the scanned image, a non-character area separation process for separating a non-character area from the scanned image, a first compression process to be performed on the character area, and second compression process to be performed on the non-character area, the second processing includes an optical character recognition process to be performed on the character area, wherein, when character-area image data to be used in the second processing is generated by the character area separation process among the plurality of sub-processes, the character-area image data is transmitted to the cooperative apparatus and continue with execution of the remaining unexecuted process that is performed after the character area separation process among the plurality of sub-processes, wherein the result of the second processing that is executed by the cooperative apparatus is received in parallel with at least one of the remaining unexecuted process executed by the processing execution unit, from the cooperative apparatus, and wherein the electronic document is generated on the basis of the result of the first processing and the result of the second processing received, the electronic document including images obtained by compressing the character area and the non-character area at different compression rates and including text data regarding a result of the optical character recognition process.

18. The electronic document generation apparatus according to claim 17, wherein the electronic document generation apparatus is an information terminal.

19. The electronic document generation apparatus according to claim 17, wherein the electronic document generation apparatus is an image forming apparatus.

20. A non-transitory computer-readable recording medium that stores a program for causing a computer that is built into an electronic document generation apparatus for generating an electronic document in cooperation with a cooperative apparatus, to execute:

a) starting first processing for generating an electronic document on the basis of a scanned image of an original document;

b) when data to be used in second processing executed by the cooperative apparatus is generated by one of a plurality of sub-processes of the first processing, transmitting the data to the cooperative apparatus at a stage where there is a remaining unexecuted process among the plurality of sub-processes, and continuing with execution of the remaining unexecuted process among the plurality of sub-processes;

c) receiving a result of the second processing executed on the data by the cooperative apparatus, from the cooperative apparatus; and d) generating the electronic document on the basis of a result of the first processing executed by the electronic document generation apparatus and the result of the second processing received in the step c);

wherein the first processing includes a character area separation process for separating a character area from the scanned image and a photographic area separation process for separating a photographic area from the scanned image to generate photographic-area image data, the second processing includes an optical character recognition process to be performed on the character area, wherein, when character-area image data to be used in the second processing is generated by the character area separation process among the plurality of sub-processes, the character-area image data is transmitted to the cooperative apparatus and continue with execution of the remaining unexecuted process that is performed after the character area separation process among the plurality of sub-processes, wherein the result of the second processing that is executed by the cooperative apparatus is received in parallel with at least one of the remaining unexecuted process executed by the processing execution unit, from the cooperative apparatus, and wherein the electronic document generated on the basis of the result of the first processing executed by the processing execution unit and the result of the second processing received by the reception unit, the electronic document including the photographic area and text data regarding a result of the optical character recognition process.

21. The electronic document generation apparatus according to claim 20, wherein the electronic document generation apparatus is an information terminal.

22. The electronic document generation apparatus according to claim 20, wherein the electronic document generation apparatus is an image forming apparatus.

* * * * *